(12) United States Patent
Yamamoto

(10) Patent No.: US 11,246,043 B2
(45) Date of Patent: Feb. 8, 2022

(54) WIRELESS COMMUNICATION DEVICE, METHOD, AND RECORDING MEDIUM

(71) Applicant: NEC Platforms, Ltd., Kawasaki (JP)

(72) Inventor: Takuya Yamamoto, Kawasaki (JP)

(73) Assignee: NEC Platforms, Ltd., Kanagawa (JP)

( * ) Notice: Subject to any disclaimer, the term of this patent is extended or adjusted under 35 U.S.C. 154(b) by 80 days.

(21) Appl. No.: 16/461,043

(22) PCT Filed: Nov. 17, 2017

(86) PCT No.: PCT/JP2017/041481
§ 371 (c)(1),
(2) Date: May 15, 2019

(87) PCT Pub. No.: WO2018/097059
PCT Pub. Date: May 31, 2018

(65) Prior Publication Data
US 2019/0313265 A1 Oct. 10, 2019

(30) Foreign Application Priority Data
Nov. 22, 2016 (JP) .............................. JP2016-226989

(51) Int. Cl.
*H04W 24/04* (2009.01)
*H04W 88/08* (2009.01)
(Continued)

(52) U.S. Cl.
CPC ........... *H04W 24/04* (2013.01); *H04W 88/08* (2013.01); *H04W 92/20* (2013.01); *H04W 84/12* (2013.01)

(58) Field of Classification Search
CPC ..... H04W 84/12; H04W 48/20; H04W 76/10; H04W 88/08; H04W 24/02; H04L 45/586; H04L 45/28; H04L 45/22
See application file for complete search history.

(56) References Cited

U.S. PATENT DOCUMENTS
2009/0213730 A1 8/2009 Zeng et al.
2009/0245163 A1 10/2009 Inoue
(Continued)

FOREIGN PATENT DOCUMENTS
JP 2004-179909 A 6/2004
JP 2004-180216 A 6/2004
(Continued)

OTHER PUBLICATIONS
International Search Report for PCT Application No. PCT/JP2017/041481, dated Jan. 30, 2018.
(Continued)

*Primary Examiner* — Asad M Nawaz
*Assistant Examiner* — Najeeb Ansari

(57) ABSTRACT

In order to enable reducing a possibility of being unable to connect to an AP in which a failure of a network connection occurs and also lessening a decline in a communication rate, a wireless communication method includes: detecting occurrence of a failure of a network connection in a first wireless communication device, when detecting the occurrence of the failure, determining whether or not to make a first wireless connection to the first wireless communication device, when making the determination to make the first wireless connection, making the first wireless connection to the first wireless communication device, and relaying a first communication between the first wireless communication device and a network.

19 Claims, 22 Drawing Sheets

(51) Int. Cl.
  *H04W 92/20* (2009.01)
  *H04W 84/12* (2009.01)

(56) References Cited

U.S. PATENT DOCUMENTS

| | | | | |
|---|---|---|---|---|
| 2013/0294314 | A1* | 11/2013 | Lee | H04W 48/18 |
| | | | | 370/311 |
| 2015/0117175 | A1* | 4/2015 | Dharmadhikari | H04L 41/0659 |
| | | | | 370/216 |
| 2015/0304983 | A1* | 10/2015 | Krening | H04B 17/318 |
| | | | | 370/254 |
| 2015/0319628 | A1 | 11/2015 | Elliott et al. | |
| 2017/0085417 | A1* | 3/2017 | O'Reirdan | H04W 24/04 |
| 2017/0094693 | A1* | 3/2017 | Law | H04W 40/244 |
| 2017/0353983 | A1* | 12/2017 | Grayson | H04L 61/203 |
| 2018/0027433 | A1* | 1/2018 | Elliott | H04W 24/04 |
| | | | | 370/216 |
| 2018/0139131 | A1* | 5/2018 | Ignatchenko | H04L 69/16 |

FOREIGN PATENT DOCUMENTS

| | | | |
|---|---|---|---|
| JP | 2009-232379 A | 10/2009 | |
| JP | 2016-039511 A | 3/2016 | |
| WO | 2014/083296 A1 | 6/2014 | |

OTHER PUBLICATIONS

English translation of Written opinion for PCT Application No. PCT/JP2017/041481.
Japanese Office Action for JP Application No. 2016-226989 dated Nov. 20, 2018 with English Translation.

* cited by examiner

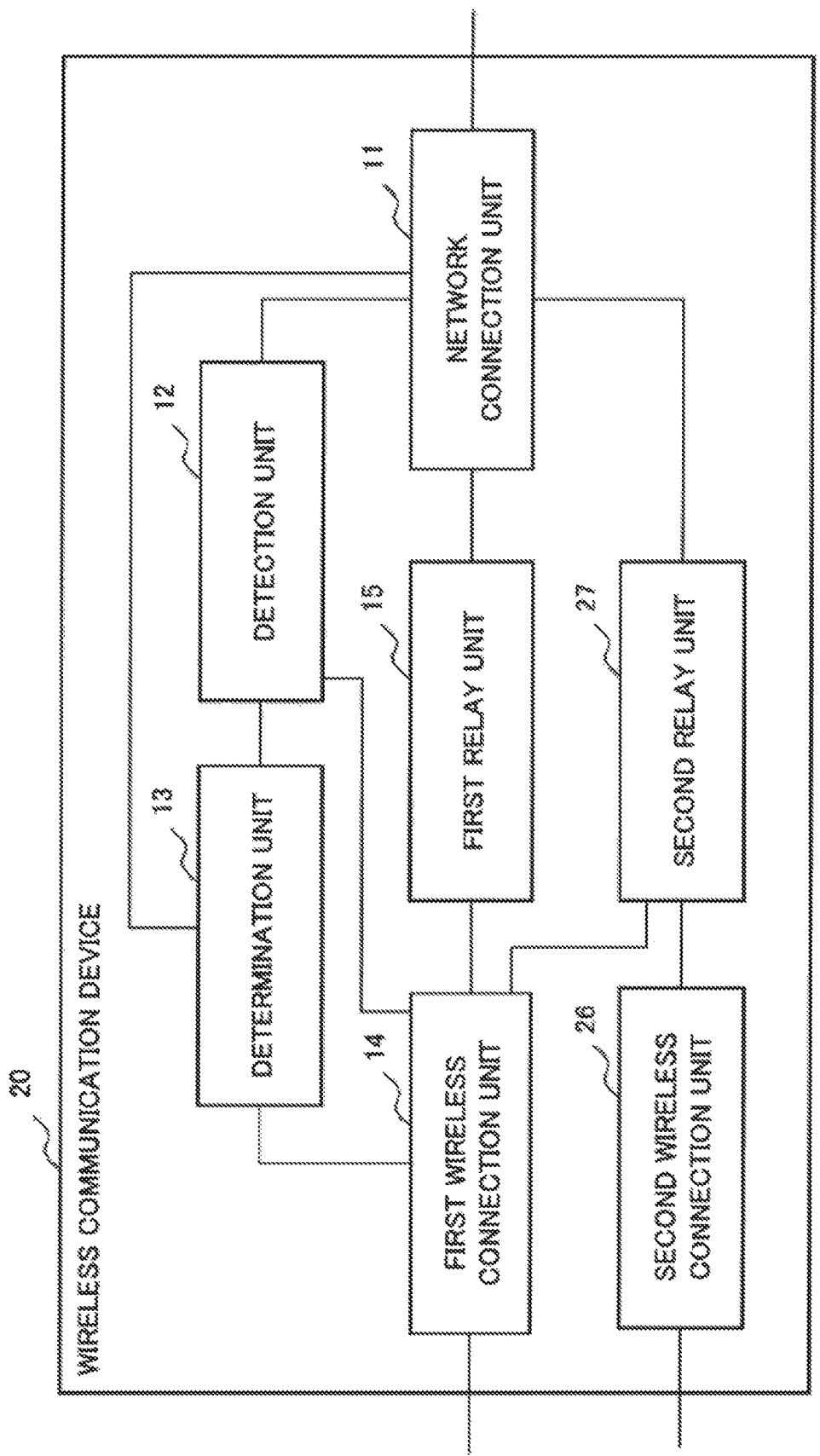

Fig.5

| | ITEM | VALUE |
|---|---|---|
| DATA LINK LAYER | SOURCE MAC ADDRESS | MAC ADDRESS OF NETWORK CONNECTION UNIT |
| | DESTINATION MAC ADDRESS | MULTICAST ADDRESS |
| | TTL | 1 |
| NETWORK LAYER | SOURCE IP ADDRESS | IP ADDRESS OF NETWORK CONNECTION UNIT |
| | DESTINATION IP ADDRESS | MULTICAST ADDRESS |
| | PROTOCOL TYPE | UDP |
| TRANSPORT LAYER | SOURCE PORT | PORT NUMBER USED |
| | DESTINATION PORT | PORT NUMBER USED |
| DATA PART | MODE TYPE | 01 : NORMAL MODE |
| | WIRELESS MAC ADDRESS 1 | MAC ADDRESS USED IN WIRELESS CONNECTION |
| | WIRELESS SSID 1 | SSID USED IN WIRELESS CONNECTION |
| | WIRELESS CHANNEL 1 | WIRELESS CHANNEL OF WIRELESS CONNECTION |
| | WIRELESS MAC ADDRESS 2 | MAC ADDRESS USED IN WIRELESS CONNECTION |
| | ... | ... |

Fig.6

|  | MAC ADDRESS OF NETWORK CONNECTION UNIT | MAC ADDRESS, SSID, AND WIRELESS CHANNEL OF WIRELESS CONNECTION |
|---|---|---|
| LOCAL DEVICE | MAC-An (WIRELESS COMMUNICATION DEVICE 20A) | MAC-A2 SSID-A2 CH-A2 |
| OTHER DEVICE | MAC-Bn (WIRELESS COMMUNICATION DEVICE 20B) | MAC-B2 SSID-B2 CH-B2 |
| OTHER DEVICE | MAC-Cn (WIRELESS COMMUNICATION DEVICE 20C) | MAC-C2 SSID-C2 CH-C2 |

Fig.7

| | ITEM | VALUE |
|---|---|---|
| DATA LINK LAYER | SOURCE MAC ADDRESS | MAC ADDRESS OF NETWORK CONNECTION UNIT |
| | DESTINATION MAC ADDRESS | MULTICAST ADDRESS |
| | TTL | 1 |
| NETWORK LAYER | SOURCE IP ADDRESS | IP ADDRESS OF NETWORK CONNECTION UNIT |
| | DESTINATION IP ADDRESS | MULTICAST ADDRESS |
| | PROTOCOL TYPE | UDP |
| TRANSPORT LAYER | SOURCE PORT | PORT NUMBER USED |
| | DESTINATION PORT | PORT NUMBER USED |
| DATA PART | MODE TYPE | 02: SEARCH MODE |
| | WIRELESS MAC ADDRESS 1 | MAC ADDRESS OF FAILED AP |
| | WIRELESS SSID 1 | SSID OF FAILED AP |
| | WIRELESS CHANNEL 1 | WIRELESS CHANNEL OF FAILED AP |
| | RADIO WAVE STATUS 1 | RADIO WAVE STATUS OF FAILED AP |
| | WIRELESS MAC ADDRESS 2 | MAC ADDRESS OF FAILED AP |
| | ... | ... |

Fig.8

| | ITEM | VALUE |
|---|---|---|
| DATA LINK LAYER | SOURCE MAC ADDRESS | MAC ADDRESS OF NETWORK CONNECTION UNIT |
| | DESTINATION MAC ADDRESS | MULTICAST ADDRESS |
| | TTL | 1 |
| NETWORK LAYER | SOURCE IP ADDRESS | IP ADDRESS OF NETWORK CONNECTION UNIT |
| | DESTINATION IP ADDRESS | MULTICAST ADDRESS |
| | PROTOCOL TYPE | UDP |
| TRANSPORT LAYER | SOURCE PORT | PORT NUMBER USED |
| | DESTINATION PORT | PORT NUMBER USED |
| DATA PART | MODE TYPE | 03: RELIEF MODE |
| | WIRELESS MAC ADDRESS 1 | MAC ADDRESS OF FAILED AP |
| | WIRELESS SSID 1 | SSID OF FAILED AP |
| | WIRELESS CHANNEL 1 | WIRELESS CHANNEL OF FAILED AP |
| | WIRELESS MAC ADDRESS 2 | MAC ADDRESS OF FAILED AP |
| | ... | ... |

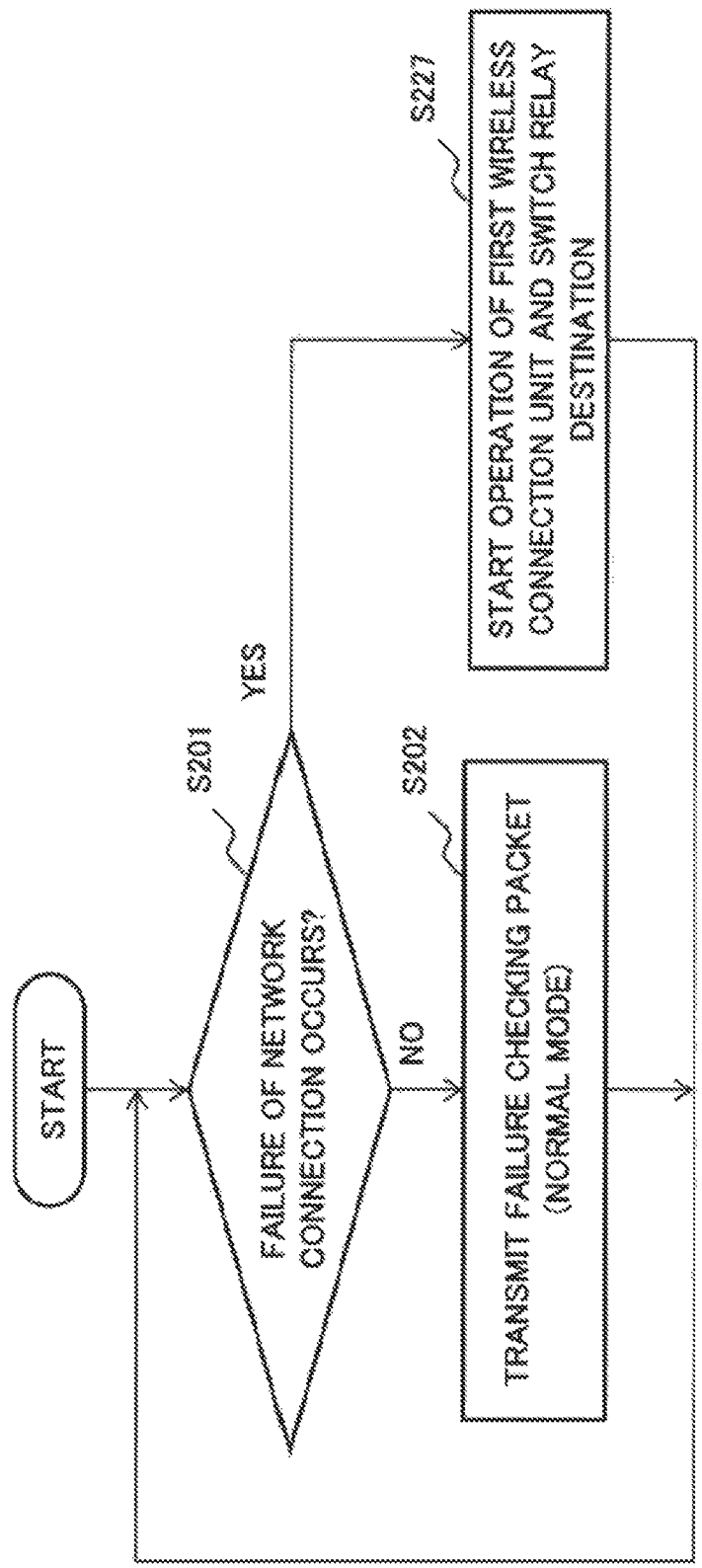

Fig.15

|  | MAC ADDRESS OF NETWORK CONNECTION UNIT | MAC ADDRESS, SSID, AND WIRELESS CHANNEL OF WIRELESS CONNECTION |
|---|---|---|
| LOCAL DEVICE | MAC-An (WIRELESS COMMUNICATION DEVICE 20A) | MAC-A2 SSID-A2 CH-A2 |
| OTHER DEVICE | MAC-Bn (WIRELESS COMMUNICATION DEVICE 20B) | MAC-B2 SSID-B2 CH-B2 |
| OTHER DEVICE | MAC-Cn (WIRELESS COMMUNICATION DEVICE 20C) | MAC-C2 SSID-C2 CH-C2 |

Fig. 16

| | MAC ADDRESS OF NETWORK CONNECTION UNIT | MAC ADDRESS, SSID, AND WIRELESS CHANNEL OF FAILED AP | RADIO WAVE STATUS OF FAILED AP |
|---|---|---|---|
| LOCAL DEVICE | MAC-An (WIRELESS COMMUNICATION DEVICE 20A) | MAC-B2 SSID-B2 CH-B2 | RF-A |
| OTHER DEVICE | MAC-Bn (WIRELESS COMMUNICATION DEVICE 20B) | - (FAILED AP) | - (FAILED AP) |
| OTHER DEVICE | MAC-Cn (WIRELESS COMMUNICATION DEVICE 20C) | MAC-B2 SSID-B2 CH-B2 | RF-C |

Fig.21

| | ITEM | VALUE |
|---|---|---|
| DATA LINK LAYER | SOURCE MAC ADDRESS | MAC ADDRESS OF NETWORK CONNECTION UNIT |
| | DESTINATION MAC ADDRESS | MULTICAST ADDRESS |
| | TTL | 1 |
| NETWORK LAYER | SOURCE IP ADDRESS | IP ADDRESS OF NETWORK CONNECTION UNIT |
| | DESTINATION IP ADDRESS | MULTICAST ADDRESS |
| | PROTOCOL TYPE | UDP |
| TRANSPORT LAYER | SOURCE PORT | PORT NUMBER USED |
| | DESTINATION PORT | PORT NUMBER USED |
| DATA PART | MODE TYPE | 04: RECOVERY MODE |
| | WIRELESS MAC ADDRESS 1 | MAC ADDRESS USED IN WIRELESS CONNECTION |
| | WIRELESS SSID 1 | SSID USED IN WIRELESS CONNECTION |
| | WIRELESS CHANNEL 1 | WIRELESS CHANNEL OF WIRELESS CONNECTION |
| | WIRELESS MAC ADDRESS 2 | MAC ADDRESS USED IN WIRELESS CONNECTION |
| | ... | ... |

WIRELESS COMMUNICATION DEVICE, METHOD, AND RECORDING MEDIUM

This application is a National Stage Entry of PCT/JP2017/041481 filed on Nov. 17, 2017, which claims priority from Japanese Patent Application 2016-226989 filed on Nov. 22, 2016, the contents of all of which are incorporated herein by reference, in their entirety.

TECHNICAL FIELD

The present invention relates to a wireless communication device, a method, and a recording medium connecting to a network.

BACKGROUND ART

When a wireless local area network (LAN) network is introduced in a private corporation or a school, a plurality of access points (hereinafter referred to as APs) are arranged in a building or the like. Further, in many cases, the APs are installed on the same network, and are bidirectionally communicable through a wired network between the APs. Further, the wired network is connected to the Internet.

One of primary factors of wireless LAN network failures is a failure that an AP cannot be connected to a wired network. Causes of the failure vary from a simple cause such as disconnection of a LAN cable or a bad contact at a wired LAN port part to a cause that needs to be investigated by a specialized network technician, or the like.

When a failure occurs in an AP, a troubleshooter approaches the AP, regardless of a cause of the failure, and for example, checks details of the failure by visually observing a lighting state (such as a color of a lit LED or a light emission pattern) of a light emitting diode (LED) provided on the AP device. Alternatively, the troubleshooter tries whether wireless LAN communication recovers by restarting the AP by plugging in and unplugging a power source of the AP. Alternatively, the troubleshooter checks a connection status of a LAN cable connected to the AP.

Regardless of a cause of the failure, while the AP cannot be connected to the wired network, a slave device belonging to the AP cannot be connected to the Internet in spite of being normally connected through wireless LAN to the AP. At this time, since the wireless LAN connection is normal, the slave device falls into a state of being unable to access the Internet in spite of not detecting a failure. Such a problem that a slave device falls into a state of being unable to access the Internet in spite of being connected to an AP is referred to as a "black hole problem."

In order to resolve the "black hole problem," many APs stop all of their own wireless networks when a failure of a wired network connection occurs. When the AP stops the wireless network, a slave device belonging to the AP up to that point tries to connect to an adjacent AP. Then, when connection to an adjacent AP succeeds, a number of wirelessly belonging slave devices of the adjacent AP increases. However, when the number of wirelessly belonging slave devices of the AP is restricted, some of slave devices may not be able to belong to the AP. Further, a slave device which is distant from an adjacent AP may not be able to belong to the adjacent AP.

On the other hand, in a method described in PTL 1, an AP detects occurrence of a failure of its own wired network connection and transmits a request for becoming a mesh access point portal to another AP closest to the AP. Then, the AP becoming a mesh access point as a result of the occurrence of the failure wirelessly connects to the another AP becoming a mesh access point portal. Consequently, a slave device belonging to the AP in which the failure occurs may connect to the Internet through the AP in which the failure occurs and the another AP.

CITATION LIST

Patent Literature

[PTL 1] Japanese Unexamined Patent Application Publication No. 2009-232379

SUMMARY OF INVENTION

Technical Problem

However, in the method described in PTL 1, the another AP becoming a mesh access point portal also performs wireless LAN communication with the AP in which the failure occurs, in addition to wireless LAN communication with a slave device belonging to the another AP. Accordingly, when the number of wirelessly belonging slave devices of the another AP is restricted, the another AP may not be able to connect to the AP in which the failure occurs. Further, an increased number of devices belonging to the another AP may cause a decline in communication rates of slave devices belonging to the AP in which the failure occurs and the another AP.

An object of the present invention is to provide a wireless communication device, a method, and a recording medium that can reduce a possibility of being unable to connect to an AP in which a failure of a network connection occurs and also lessen a decline in a communication rate.

Solution to Problem

For settling the above-mentioned problem, a wireless communication device according to an exemplary aspect of the invention comprises: a network connection means for connecting to a network, a detection means for detecting occurrence of a failure of a network connection in a first wireless communication device, a determination means for, when detecting the occurrence of the failure, determining whether or not to make a first wireless connection to the first wireless communication device, a first wireless connection means for, when making the determination to make the first wireless connection, making the first wireless connection to the first wireless communication device, and a first relay means for relaying a first communication between the first wireless communication device and the network.

And, a wireless communication method according to an exemplary aspect of the invention comprises: detecting occurrence of a failure of a network connection in a first wireless communication device, when detecting the occurrence of the failure, determining whether or not to make a first wireless connection to the first wireless communication device, when making the determination to make the first wireless connection, making the first wireless connection to the first wireless communication device, and relaying a first communication between the first wireless communication device and a network.

And, a non-transitory computer readable recording medium according to an exemplary aspect of the invention is recorded with a wireless communication program causing a computer to execute: a network connection function of connecting to a network, a detection function of detecting occurrence of a failure of a network connection in a first wireless communication device, a determination function of, when detecting the occurrence of the failure, determining whether or not to make a first wireless connection to the first wireless communication device, a first wireless connection function of, when making the determination to make the first wireless connection, making the first wireless connection to the first wireless communication device, and a first relay function of relaying a first communication between the first wireless communication device and the network.

Advantageous Effects of Invention

A wireless communication device, a method, and a recording medium, according to the present invention, can reduce a possibility of being unable to connect to an AP in which a failure of a network connection occurs and also lessen a decline in a communication rate.

BRIEF DESCRIPTION OF DRAWINGS

FIG. 4 shows a diagram illustrating a configuration example of a wireless communication device according to the second to fourth example embodiments of the present invention.

FIG. 5 shows a diagram illustrating an example of a failure checking packet according to the second example embodiment of the present invention.

FIG. 6 shows a diagram illustrating an example of information stored in a database according to the second example embodiment of the present invention.

FIG. 7 shows a diagram illustrating an example of a failure checking packet according to the second example embodiment of the present invention.

FIG. 8 shows a diagram illustrating an example of a failure checking packet according to the second example embodiment of the present invention.

FIG. 9 shows a diagram illustrating an operation example of the wireless communication device according to the second example embodiment of the present invention.

FIG. 15 shows a diagram illustrating an example of information stored in the database according to the second example embodiment of the present invention.

FIG. 16 shows a diagram illustrating an example of information stored in the database according to the second example embodiment of the present invention.

FIG. 21 shows a diagram illustrating an example of a failure checking packet according to the third example embodiment of the present invention.

EXAMPLE EMBODIMENT

First Example Embodiment

A first example embodiment of the present invention will be described.

Figure 1:
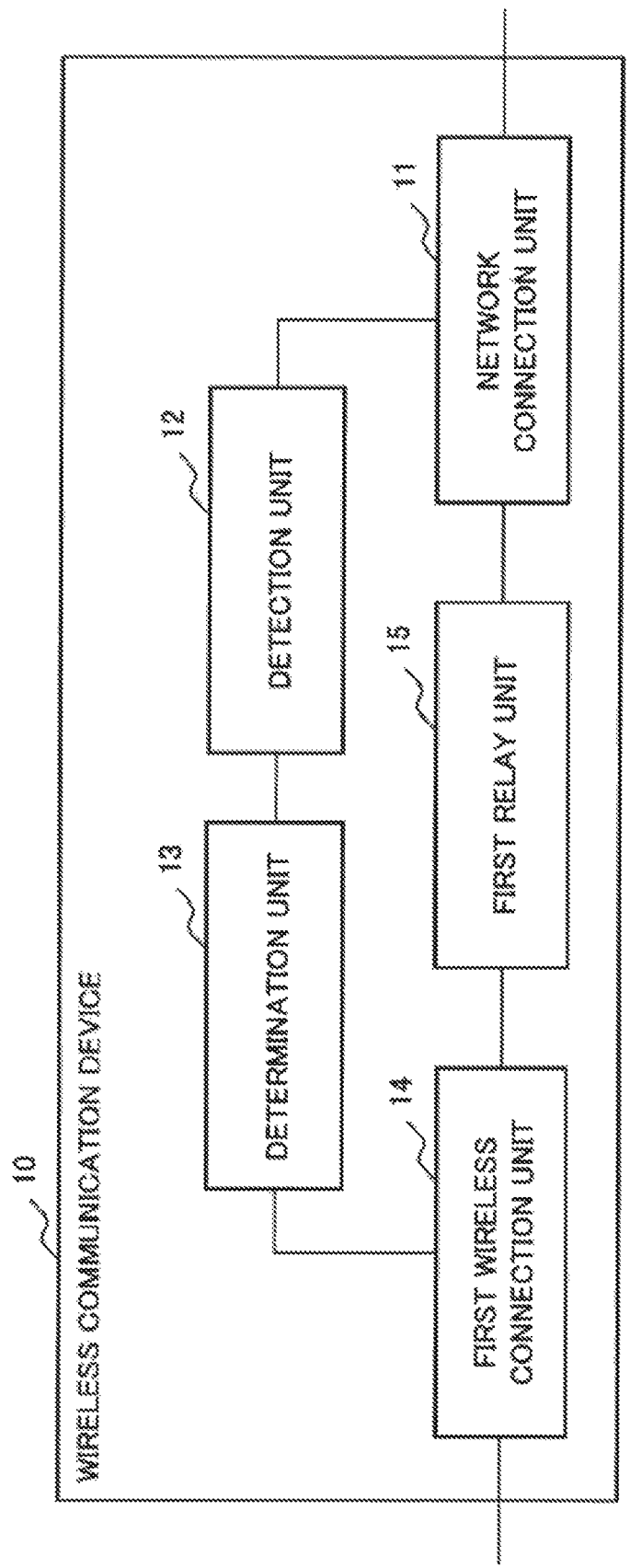
FIG. 1 shows a diagram illustrating a configuration example of a wireless communication device according to a first example embodiment of the present invention.

FIG. 1 illustrates a configuration example of a wireless communication device 10 according to the present example embodiment. The wireless communication device 10 according to the present example embodiment is configured with a network connection unit 11, a detection unit 12, a determination unit 13, a first wireless connection unit 14, and a first relay unit 15.

The network connection unit 11 is a part connecting to a network. The detection unit 12 is a part detecting occurrence of a failure of a network connection in a first wireless communication device. The determination unit 13 is a part determining whether or not to make a first wireless connection to the first wireless communication device when occurrence of a failure is detected. The first wireless connection unit 14 is a part making a first wireless connection to the first wireless communication device when a first wireless connection is determined to be made. The first relay unit 15 is a part relaying a first communication between the first wireless communication device and the network.

Figure 2:
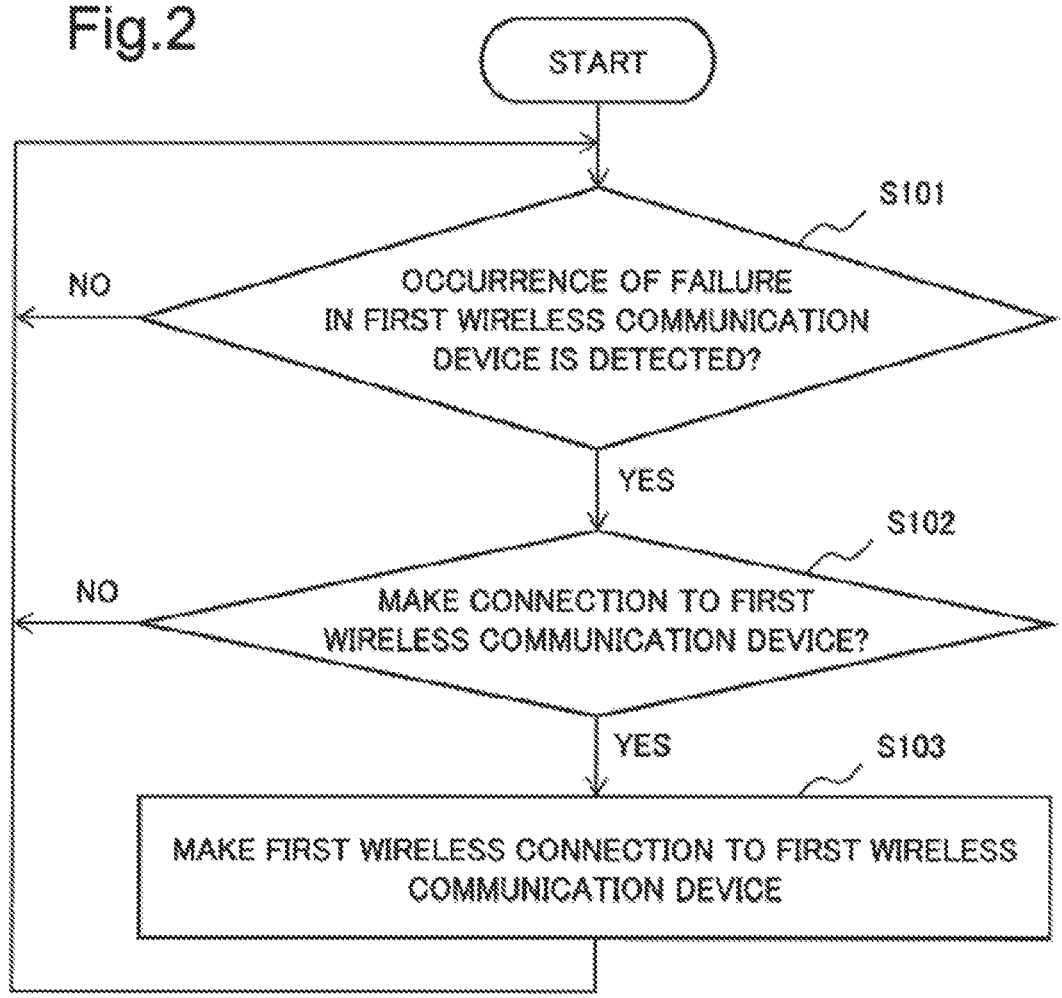
FIG. 2 shows a diagram illustrating an operation example of the wireless communication device according to the first example embodiment of the present invention.

By configuring the wireless communication device 10 as described above, when detecting occurrence of a failure of a network connection in a first wireless communication device, the wireless communication device 10 determines whether or not to make a first wireless connection to the first wireless communication device. Then, when determining to make a first wireless connection, the wireless communication device 10 makes a first wireless connection to the first wireless communication device and relays a first communication between the first wireless communication device and the network. When a failure occurs in a first wireless communication device, the wireless communication device 10 makes a first wireless connection to the first wireless communication device in which the failure occurs. Consequently, even when there is a slave device belonging to the wireless communication device 10, the wireless communication device 10 can make a first wireless connection to the first wireless communication device in which a failure occurs, separately from a communication with the slave device. Accordingly, a possibility of being unable to connect to an AP in which a failure of a network connection occurs can be reduced, and also a decline in a communication rate can be lessened.

Next, FIG. 2 illustrates an operation example of the wireless communication device 10 according to the present example embodiment.

When the detection unit 12 detects occurrence of a failure of a network connection in a first wireless communication device (YES in Step S101), the determination unit 13 determines whether or not to make a first wireless connection to the first wireless communication device. Then, when the determination unit 13 determines to make a first wireless connection to the first wireless communication device (YES in Step S102), the first wireless connection unit 14 makes a first wireless connection to the first wireless communication device. Further, the first relay unit 15 relays a first communication between the first wireless communication device and the network (Step S103).

By operating as described above, when detecting occurrence of a failure of a network connection in a first wireless communication device, the wireless communication device 10 determines whether or not to make a first wireless connection to the first wireless communication device. Then, when determining to make a first wireless connection, the wireless communication device 10 makes a first wireless connection to the first wireless communication device and relays a first communication between the first wireless communication device and the network. Consequently, a possibility of being unable to connect to an AP in which a failure of a network connection occurs can be reduced, and also a decline in a communication rate can be lessened.

As described above, when detecting occurrence of a failure of a network connection in a first wireless communication device, the wireless communication device 10 according to the first example embodiment of the present invention determines whether or not to make a first wireless connection to the first wireless communication device. Then, when determining to make a first wireless connection, the wireless communication device 10 makes a first wireless connection to the first wireless communication device and relays a first communication between the first wireless communication device and the network. When a failure occurs in a first wireless communication device, the wireless communication device 10 makes a first wireless connection to the first wireless communication device in which the failure occurs. Consequently, even when there is a slave device belonging to the wireless communication device 10, the wireless communication device 10 can make a first wireless connection to the first wireless communication device in which a failure occurs, separately from a communication with the slave device. Accordingly, a possibility of being unable to connect to an AP in which a failure of a network connection occurs can be reduced, and also a decline in a communication rate can be lessened.

Second Example Embodiment

Next, a second example embodiment of the present invention will be described. A specific example of the wireless communication device 10 being a wireless LAN access point will be described in the present example embodiment.

Figure 3:
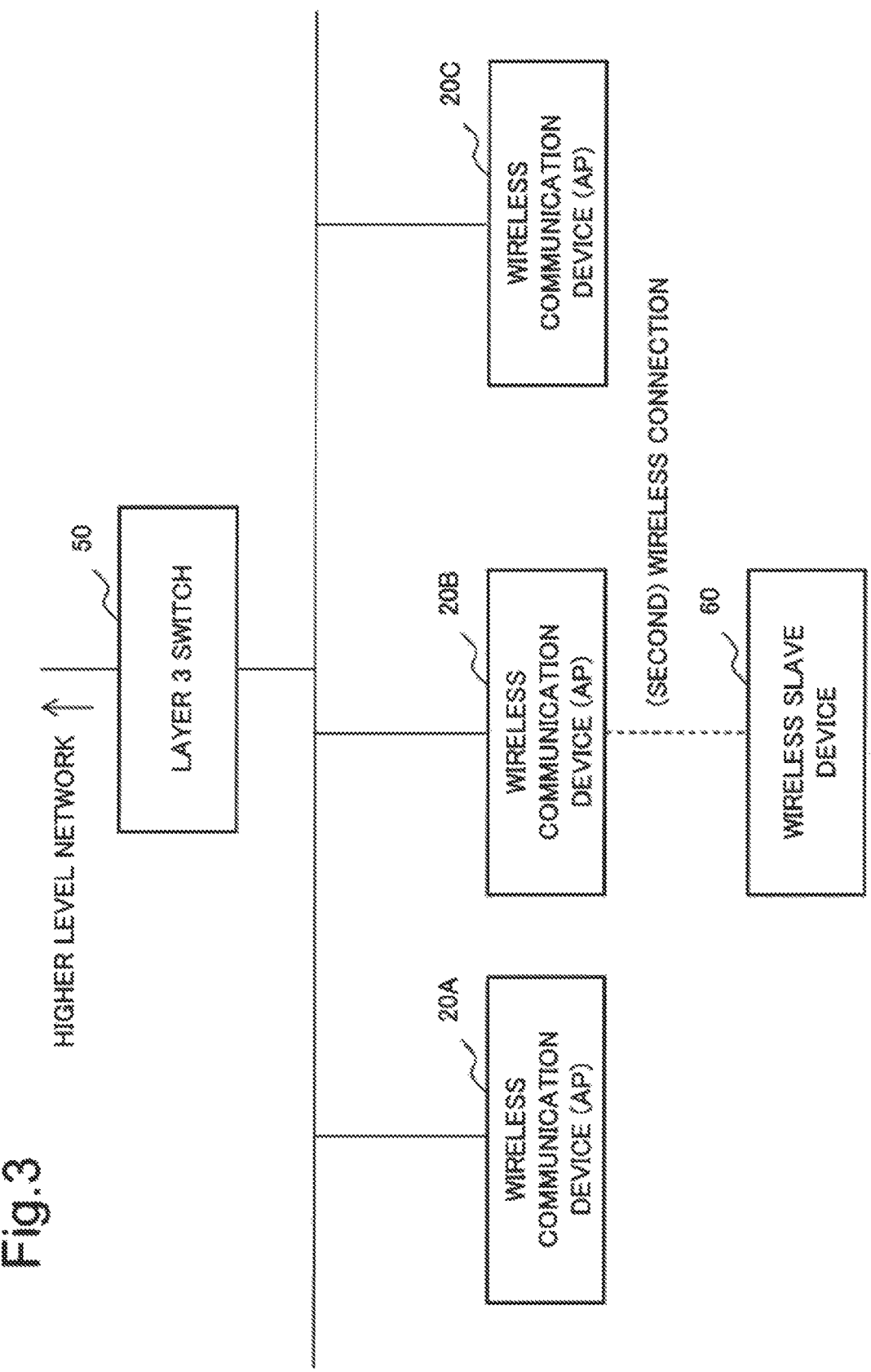
FIG. 3 shows a diagram illustrating a configuration example of a wireless communication system according to a second example embodiment of the present invention.

First, FIG. 3 illustrates a configuration example of a wireless communication system according to the present example embodiment. The wireless communication system according to the present example embodiment is configured with wireless communication devices 20 (20A, 20B, 20C), a layer 3 switch 50, and a wireless slave device 60.

The wireless communication devices 20 (20A, 20B, 20C) are wireless LAN access points (APs). In this example, one or more APs are installed on the same network, and the APs are mutually communicable through a network.

Furthermore, the layer 3 switch 50 for connecting to the Internet from the same network is installed in this example. It is assumed that the outside of the layer 3 switch 50 is a higher level network and is a network separate from the network to which the APs are directly connected.

Furthermore, the wireless slave device 60 is connected to the wireless communication device 20B through a wireless LAN in this example. The wireless slave device 60 may access the higher level network through the wireless communication device 20B.

Zero or more wireless slave devices 60 may exist in the wireless communication system, and a wireless slave device 60 may also be connected to the wireless communication device 20A or the wireless communication device 20C. Further, each of the wireless communication devices 20 (20A, 20B, 20C) may be connected to zero or more wireless slave devices 60.

Next, FIG. 4 illustrates a configuration example of the wireless communication device 20 (20A, 20B, 20C) according to the present example embodiment.

The wireless communication device 20 is configured with a network connection unit 11, a detection unit 12, a determination unit 13, a first wireless connection unit 14, a first relay unit 15, a second wireless connection unit 26, and a second relay unit 27.

The network connection unit 11 is a part connecting to the network. In the case of the present example embodiment, the network connection unit 11 connects to the network through a wired LAN.

The first wireless connection unit 14 and the second wireless connection unit 26 are parts performing wireless LAN connections. The first wireless connection unit 14 is a part making a connection (first wireless connection) to another AP, and the second wireless connection unit 26 is a part making a connection (second wireless connection) to a wireless slave device. By including two wireless connection units, the wireless communication device 20 according to the present example embodiment can make wireless connections at mutually different frequency bands to another AP and a wireless slave device.

Furthermore, by including a wireless connection unit for connection to another AP, even when a number of connected wireless slave devices is restricted, another AP may belong to the wireless communication device 20, and also a decline in a communication rate due to another AP belonging to the wireless communication device 20 can be reduced.

Each of the first wireless connection unit 14 and the second wireless connection unit 26 may have an independent hardware part, or the two units may share one hardware part and virtually perform two wireless communications by software control.

The first relay unit 15 is a part relaying a communication between another AP connected to the first wireless connection unit 14 and the network connected to the network connection unit 11. The second relay unit 27 is a part relaying a communication (second communication) between a wireless slave device connected to the second wireless connection unit 26 and the network connected to the network connection unit 11. The second relay unit 27 may relay a communication between a wireless slave device connected to the second wireless connection unit 26 and another AP connected to the first wireless connection unit 14.

The detection unit 12 is a part detecting a failure of a network connection in another AP. The determination unit 13 is a part determining whether or not to connect to another AP when a failure of a network connection is detected in the other AP.

The network connection unit 11 according to the present example embodiment transmits a failure checking packet to the network at every predetermined time. In the case of the system configuration in FIG. 3, each of the wireless communication device 20A, the wireless communication device 20B, and the wireless communication device 20C transmits a failure checking packet to the network.

FIG. 5 illustrates an example of set values in a failure checking packet. It is assumed that an item not described in FIG. 5 has a form conforming to a specification of a general communication protocol.

Out of items for the data link layer, a media access control (MAC) address of the network connection unit 11 in an AP transmitting the failure checking packet is set to a source MAC address. Further, a multicast address is set to a destination MAC address so that the packet may be transmitted to every other AP on the same network. Further, 1 is set to a time to live (TTL) so as to inhibit transmission to outside the same network.

Out of items for the network layer, an Internet Protocol (IP) address of the network connection unit 11 in an AP transmitting the failure checking packet is set to a source IP address, similarly to the source address for the data link layer. Further, a multicast address is set to a destination IP address.

Out of items for the transport layer, communication port numbers to be used are set to a source port and a destination port. All of the wireless communication device 20A, the wireless communication device 20B, and the wireless communication device 20C may use common ports.

A data part according to the present example embodiment stores each of a mode type, a MAC address used by the first wireless connection unit 14 and/or the second wireless connection unit 26, a service set identifier (SSID), and a wireless channel. When a plurality of wireless connection units operate in an AP, sets of a MAC address, an SSID, and a wireless channel as many as a number of the operating wireless connection units are listed in the data part.

For example, it is assumed that the second wireless connection unit 26 in the wireless communication device 20B makes a second wireless connection to the wireless slave device 60, and the first wireless connection unit 14 is not in operation. At this time, the wireless communication device 20B stores a MAC address, an SSID, and a wireless channel that are used in the second wireless connection unit 26 into the data part of a failure checking packet.

A mode type indicates a type of a content notified by the failure checking packet. When a failure of a network connection does not occur, the network connection unit 11 transmits information about the network connection unit 11 by a failure checking packet. At this time, a mode type of the failure checking packet is determined to be a "normal mode" (01).

Furthermore, when a failure checking packet for the normal mode cannot be received from a certain AP for a predetermined period, the detection unit 12 according to the present example embodiment detects occurrence of a failure of a network connection in the AP.

When receiving a failure checking packet from another AP, the detection unit 12 checks a mode type. When the mode type indicates the normal mode, the data part of the failure checking packet is stored into a database with a MAC address of the network connection unit 11 as a tag. Then, when a failure checking packet is received from the same AP again, the database is updated.

FIG. 6 illustrates an example of the database. The database stores information about the local device and information about other devices in this example. When receiving a failure checking packet for the normal mode from another AP, the detection unit 12 stores information about the other device in FIG. 6 into the database. The example is an example of information stored in the database when only the second wireless connection unit 26 is in operation (the first wireless connection unit 14 is not in operation) in the wireless communication device 20A, the wireless communication device 20B, and the wireless communication device 20C.

For example, when a failure of a network connection in another AP being the wireless communication device 20B occurs, the detection units 12 in the wireless communication device 20A and the wireless communication device 20C no longer can receive a failure checking packet for the normal mode from the wireless communication device 20B. When a failure checking packet for the normal mode from another AP cannot be received for a predetermined period, the detection unit 12 detects occurrence of a failure of a network connection in the AP.

Furthermore, the determination unit 13 determines whether or not to connect to an AP in which a failure occurs (hereinafter referred to as a failed AP), based on a radio wave status of the failed AP, according to the present example embodiment. When the detection unit 12 detects occurrence of a failure, the determination unit 13 acquires a radio wave status of the failed AP and determines whether or not to connect to the failed AP, according to the present example embodiment. Alternatively, the determination unit 13 may acquire radio wave statuses of other APs and determine an AP to be connected when a failure occurs in the AP, before occurrence of a failure. The operation of determining whether or not to connect to a failed AP, based on a radio wave status is hereinafter referred to as a search operation. Further, the wireless communication device 20 performs a search operation in parallel with an operation as a normal access point.

The determination unit 13 receives a wireless radio wave from a failed AP and measures a radio wave status, according to the present example embodiment. At this time, the determination unit 13 first acquires a MAC address, an SSID, and a wireless channel of the failed AP from the database. For example, it is assumed that the information in FIG. 6 is stored in the database of the wireless communication device 20A, and a failure occurs in the wireless communication device 20B. At this time, the determination unit 13 in the wireless communication device 20A acquires a MAC address (MAC-B2), an SSID (SSID-B2), and a wireless channel (CH-B2) of the wireless communication device 20B.

Then, a beacon signaled by the failed AP is received by use of the first wireless connection unit 14 or the second wireless connection unit 26, and a radio wave status of the beacon is measured. When the failed AP performs a plurality of wireless communications on a plurality of channels, a radio wave status of every wireless communication is measured. As a radio wave status, a received signal strength indicator (RSSI), a signal to noise (SN) ratio, a bit error rate (BER), an indicator combining the above, and the like may be used.

Then, the determination unit 13 puts the measured radio wave status of the failed AP on a failure checking packet for radio wave status notification and transmits the packet to another AP.

FIG. 7 is a setting example of a failure checking packet for radio wave status notification. A "search mode" (02) indicating a failure checking packet for notifying a radio wave status is stored in the mode type in this example. Further, a MAC address, an SSID, a wireless channel, and a radio wave status of a failed AP are stored in the data part. When the failed AP performs a plurality of wireless communications on a plurality of channels, a set of a MAC address, an SSID, a wireless channel, and a radio wave status is stored for every channel.

Then, when receiving a failure checking packet with a mode type being the search mode from another AP excluding the failed AP, the determination unit 13 compares a locally measured radio wave status with a radio wave status measured by the other AP (a second wireless communication device). Then, when the locally measured radio wave status is best, the determination unit 13 determines to connect to the failed AP. When the determination unit 13 determines to connect to the failed AP, the wireless communication device 20 shifts to a relief mode. At this time, the wireless communication device 20 performs an operation in the relief mode in parallel with an operation as a normal access point. The relief mode is a mode for connecting to a failed AP.

When shifting to the relief mode, the determination unit 13 transmits, to the network, a failure checking packet indicating a shift to the relief mode.

FIG. 8 illustrates an example of set values in a failure checking packet transmitted by the wireless communication device 20 when shifting to the relief mode. When shifting to the relief mode, the wireless communication device 20 stores a mode type (03) indicating the relief mode, and a MAC address, an SSID, and a wireless channel of a failed AP into the data part and transmits the packet.

By transmitting a failure checking packet for the relief mode, the wireless communication device 20 can signal, to another AP, that the wireless communication device 20 connects to a failed AP. When receiving a failure checking packet for the relief mode from another AP, the determination unit 13 learns that the other AP connects to a failed AP and therefore ends the search operation. Thus, even when there are two or more APs with the best radio wave status, an AP shifting to the relief mode first and transmitting a failure checking packet for the relief mode shifts to the relief mode, and other APs do not shift to the relief mode.

When the determination unit 13 determines to connect to a failed AP, the first wireless connection unit 14 starts a wireless operation with a unique relief profile (a MAC address, an SSID, an encryption mode, an encryption key, and a wireless channel) for connecting to the failed AP. At this time, the first wireless connection unit 14 operates in a master unit mode and transmits a beacon at every predetermined time.

The detection unit 12 in the wireless communication device 20 further detects occurrence of a failure of a network connection in the local device. For example, the detection unit 12 detects a failure of a network connection by detecting disconnection of a cable connected to the network connection unit 11 or detecting a failure of the network connection unit 11. Alternatively, the detection unit 12 detects a failure of a network connection by detecting that a packet is not received from the network side for a predetermined period.

When detecting occurrence of a failure of a network connection in the local device, the first wireless connection unit 14 starts a wireless operation with a unique relief profile (a MAC address, an SSID, an encryption mode, an encryption key, and a wireless channel) for connecting to an AP in the relief mode. At this time, the first wireless connection unit 14 operates in a slave device mode.

Since a failed AP belongs to an AP in the relief mode, wireless profiles of the AP in the relief mode and the failed AP need to be the same. Accordingly, the respective wireless communication devices 20 previously share relief profiles. As a sharing method, an installer of APs or a network administrator may set relief profiles in advance, or relief profiles may be mutually shared among APs by some means.

When a relief profile is set to the first wireless connection unit 14 in the failed AP, and the first wireless connection unit 14 starts an operation, the first wireless connection unit 14 in the failed AP detects a beacon from the AP in the relief mode and wirelessly connects to the AP in the relief mode. It is assumed that the wireless connection is a general connection defined by Institute of Electrical and Electronic Engineers (IEEE) 802.11.

Furthermore, the second relay unit 27 in the failed AP switches a transfer destination of data of the wireless slave device 60 belonging to the second wireless connection unit 26 to the AP in the relief mode connected to the first wireless connection unit 14.

By configuring the wireless communication device 20 as described above, when detecting occurrence of a failure of a network connection in another AP, the wireless communication device 20 determines whether or not to connect to the failed AP. Then, when determining to make a connection, the wireless communication device 20 makes a first wireless connection to the failed AP and relays a first communication between the failed AP and the network. When a failure occurs in another AP, the wireless communication device 20 makes a first wireless connection to the failed AP. Consequently, the wireless communication device 20 can make a first wireless connection to the failed AP, separately from a communication with a slave device belonging to the wireless communication device 20. Accordingly, a possibility of being unable to connect to an AP in which a failure of a network connection occurs can be reduced, and also a decline in a communication rate can be lessened.

Next, FIGS. 9 to 13 illustrate operation examples of the wireless communication device 20 (20A, 20B, 20C) according to the present example embodiment.

Figure 10:
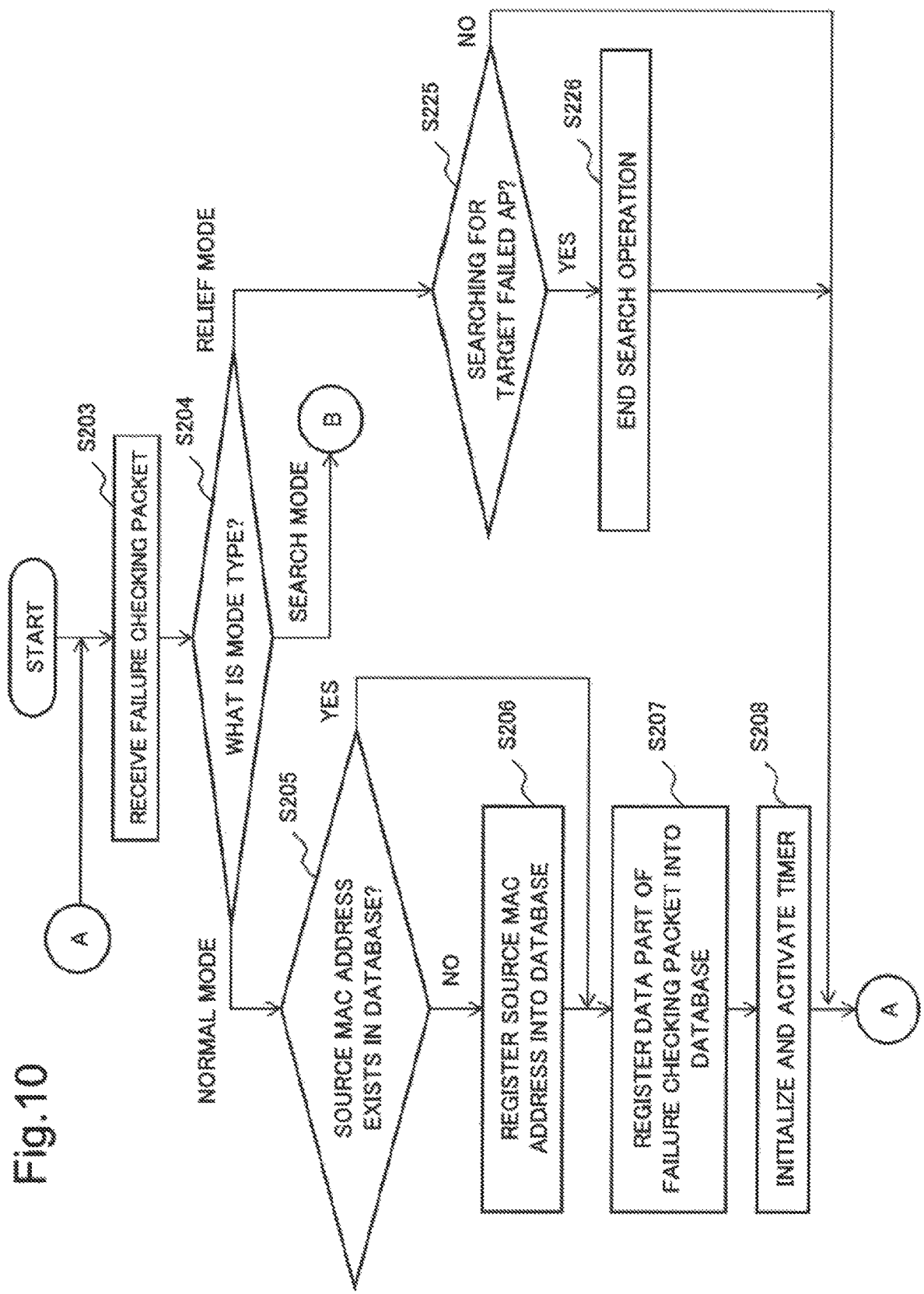
FIG. 10 shows a diagram illustrating an operation example of the wireless communication device according to the second example embodiment of the present invention.
Figure 13:
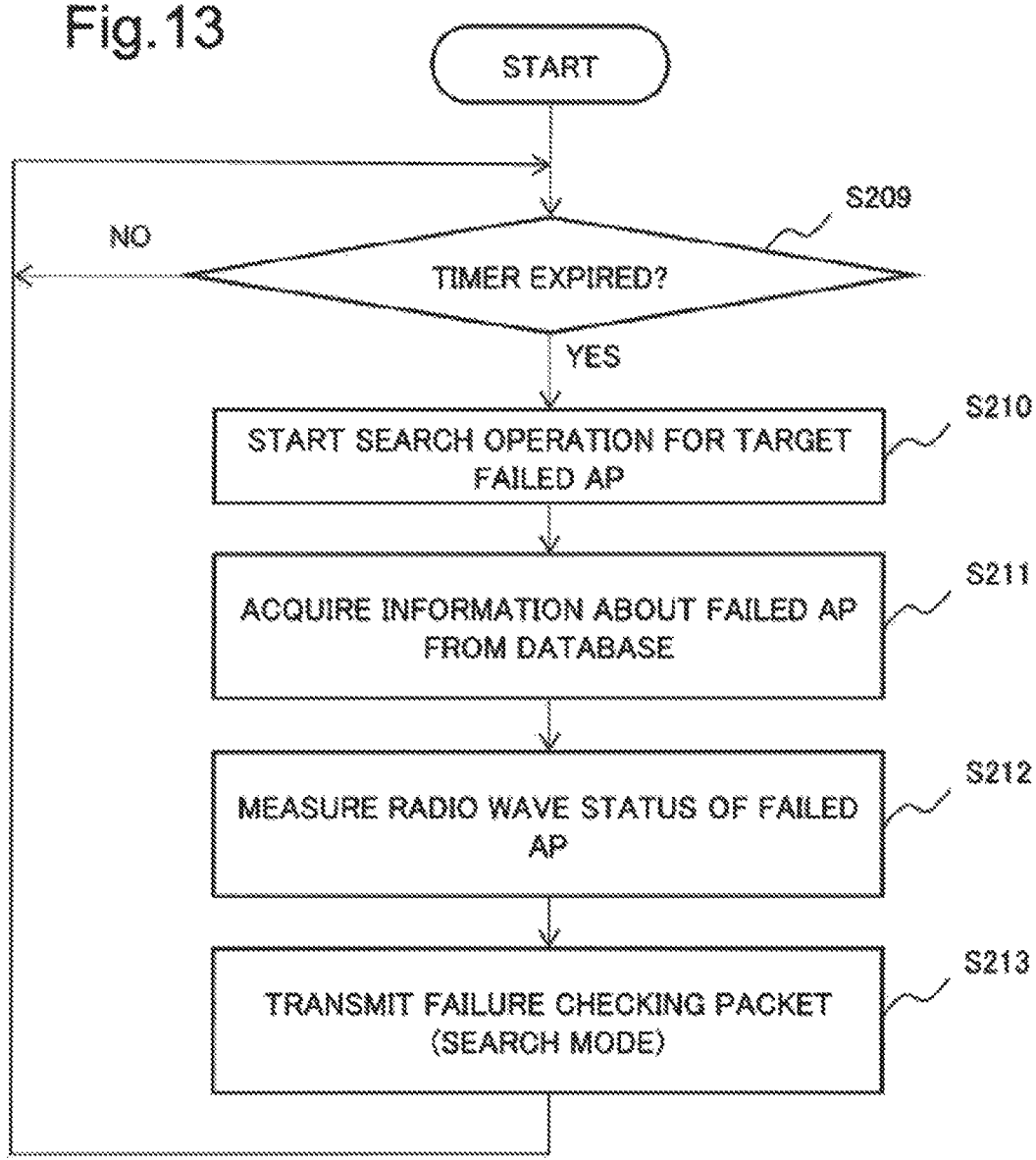
FIG. 13 shows a diagram illustrating an operation example of the wireless communication device according to the second example embodiment of the present invention.

It is assumed that the second wireless connection unit 26 in the wireless communication device 20 (20A, 20B, 20C) periodically transmits a beacon as a master unit of an access point. Then, it is assumed that when there is a wireless slave device 60 belonging to the second wireless connection unit 26, the second relay unit 27 relays a communication between the wireless slave device 60 and the network. It is further assumed that, at a start of operation, the first wireless connection unit 14 in the wireless communication device 20 (20A, 20B, 20C) stops an operation, and the first relay unit 15 does not perform relaying. It is further assumed that a start of each of the operations in FIGS. 9, 10, and 13 is triggered by power-on of the wireless communication device 20 or a predetermined event after power-on such as a start-up operation by a user.

First, the network connection unit 11 in the wireless communication device 20 (20A, 20B, 20C) transmits a failure checking packet for the normal mode at every predetermined time (Step S202) until a failure of a network connection occurs (NO in Step S201 in FIG. 9). At this time, the network connection unit 11 stores, for example, the set values indicated in FIG. 5 into a failure checking packet.

When receiving a failure checking packet (Step S203 in FIG. 10), the detection unit 12 in the wireless communication device 20 (20A, 20B, 20C) checks a mode type of the failure checking packet. When the mode type indicates the normal mode (NORMAL MODE in Step S204), the detection unit 12 checks whether a source MAC address of the failure checking packet exists in the database. When the source MAC address of the failure checking packet does not exist in the database (NO in Step S205), information in the data part is registered in the database with the source MAC address of the failure checking packet as a tag (Steps S206 and S207). When the source MAC address of the failure checking packet exists in the database (YES in Step S205), information in the data part in the database is updated (Step S207). Then, a timer for each source MAC address is initialized and activated (Step S208).

For example, when receiving a failure checking packet for the normal mode from the wireless communication device 20B, the wireless communication device 20A associates a MAC address of the wireless communication device 20B with the data part of the failure checking packet and stores the MAC address and the data part into the database. Consequently, a MAC address, an SSID, and a wireless channel of the second wireless connection unit 26 in the wireless communication device 20B are stored in the database in the wireless communication device 20A with the MAC address of the network connection unit 11 in the wireless communication device 20B as a tag (FIG. 15). Further, when receiving a failure checking packet for the normal mode from the wireless communication device 20C, the wireless communication device 20A similarly stores information about the wireless communication device 20C into the database. The wireless communication device 20B and the wireless communication device 20C similarly store information about another AP into the local database.

Figure 14:
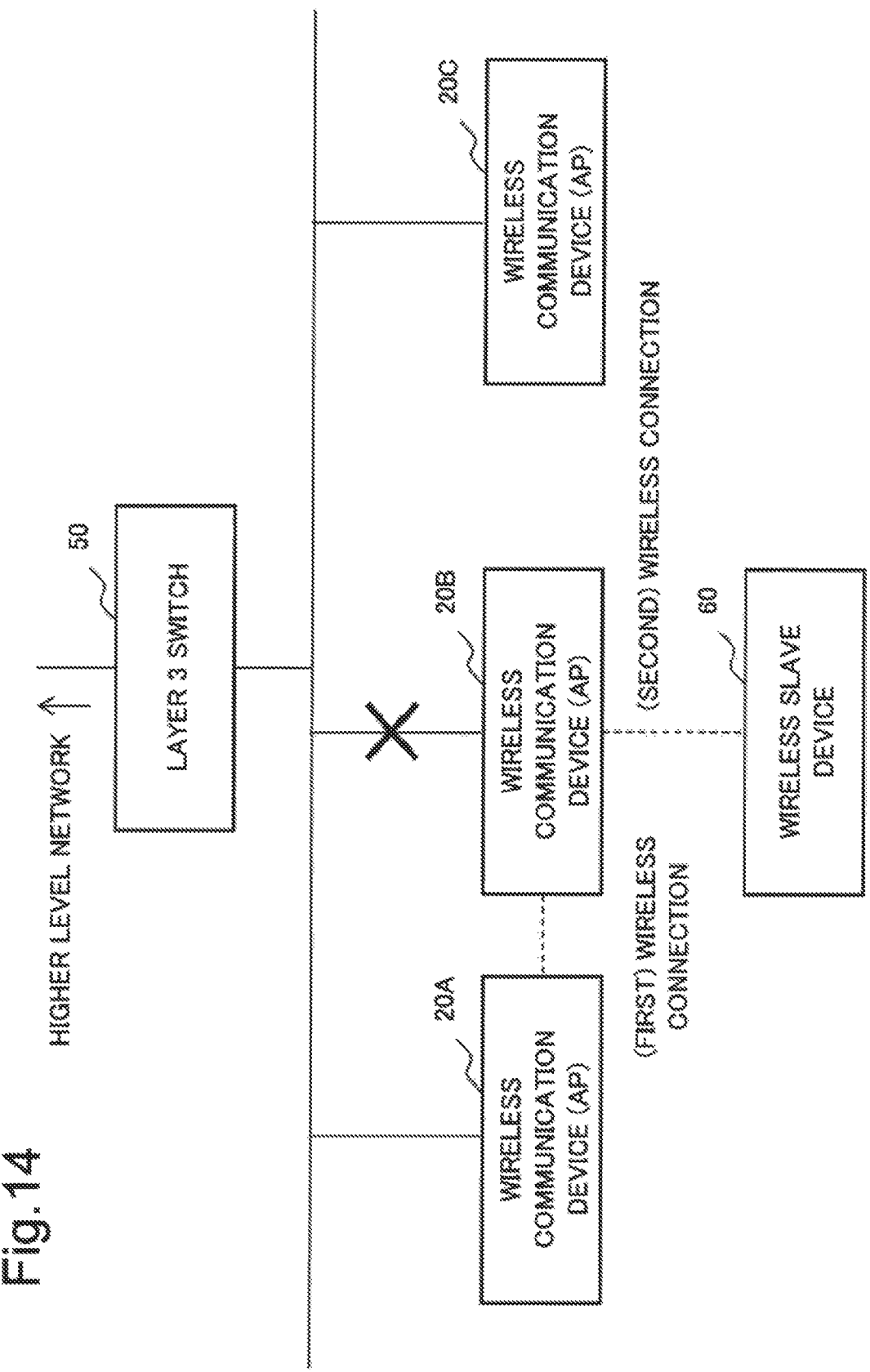
FIG. 14 shows a diagram illustrating a configuration example of the wireless communication system according to the second example embodiment of the present invention.

It is assumed here that a failure of a network connection occurs in the wireless communication device 20B as illustrated in FIG. 14. At this time, the wireless communication device 20A and the wireless communication device 20C become unable to receive a failure checking packet from the wireless communication device 20B. Then, when a predetermined period elapses after the wireless communication device 20A (20C) receives a failure checking packet from the wireless communication device 20B, a timer for the wireless communication device 20B expires. When the timer for the wireless communication device 20B expires (YES in Step S209 in FIG. 13), the detection unit 12 in each of the wireless communication device 20A and the wireless communication device 20C detects occurrence of a failure of a network connection in the wireless communication device 20B.

When the detection unit 12 detects occurrence of a failure of a network connection in the wireless communication device 20B, the wireless communication device 20A (20C) starts a search operation (Step S210). The search operation (Steps S210 to S213) may be performed on each AP before occurrence of a failure.

When starting the search operation, the determination unit 13 in the wireless communication device 20A (20C) acquires information about the failed AP (wireless communication device 20B) from the local database (Step S211). Then, the determination unit 13 adjusts a wireless channel of the first wireless connection unit 14 to that of the second wireless connection unit 26 in the wireless communication device 20B, receives a beacon signaled by the wireless communication device 20B, and measures a radio wave status of the beacon (Step S212). After measuring the radio wave status, the detection unit 12 transmits a failure checking packet for the search mode through the network connection unit 11 (Step S213). For example, the set values indicated in FIG. 7 are stored in the failure checking packet for the search mode.

Figure 11:
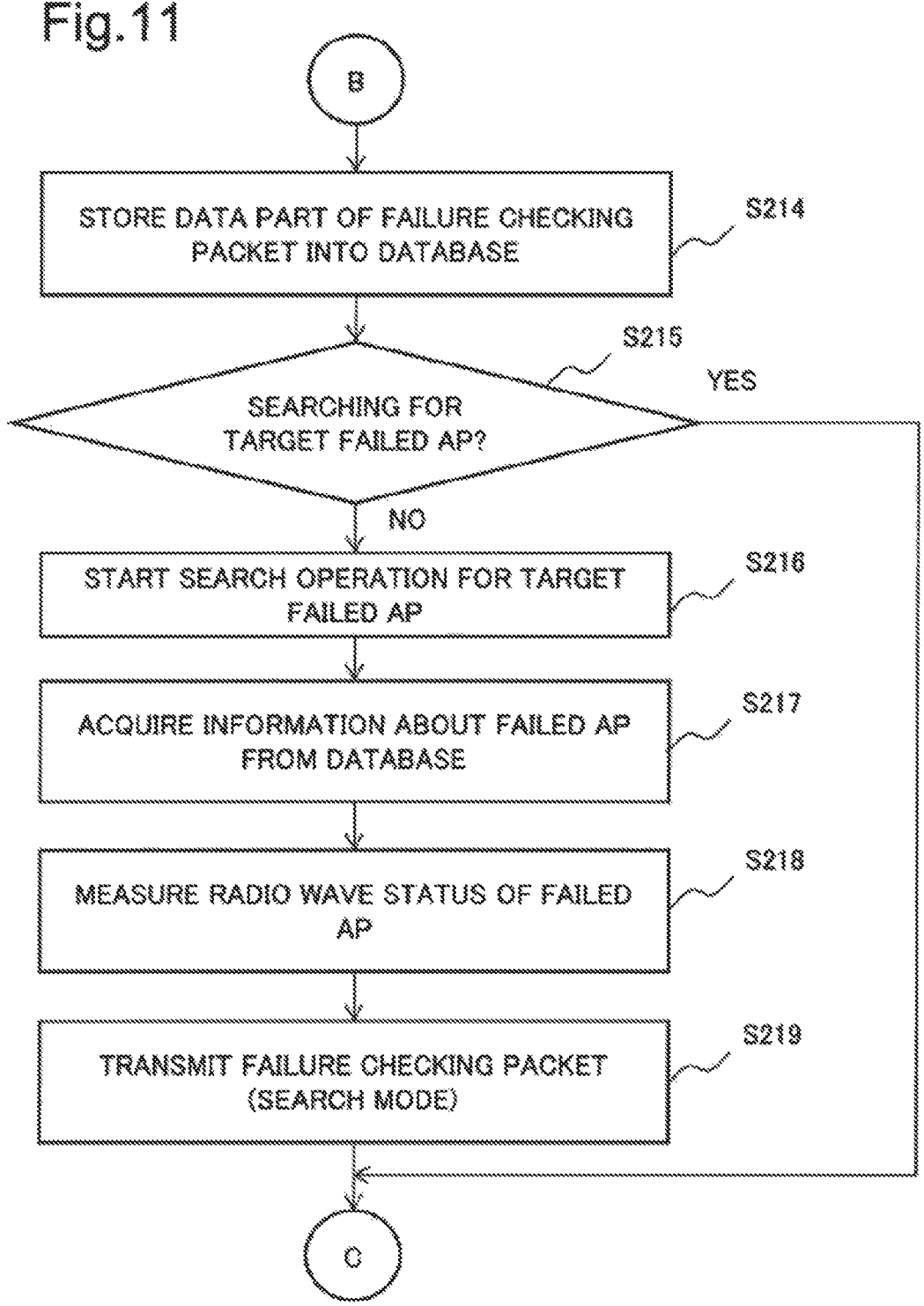
FIG. 11 shows a diagram illustrating an operation example of the wireless communication device according to the second example embodiment of the present invention.

When receiving the failure checking packet for the search mode (SEARCH MODE in Step S204 in FIG. 10), the wireless communication device 20A (20C) stores the data part into the database with a source MAC address of the failure checking packet as a tag (Step S214 in FIG. 11).

FIG. 16 illustrates an example of a radio wave status stored in the database in the wireless communication device 20A. A MAC address, an SSID, and a wireless channel of the second wireless connection unit 26 in a failed AP (wireless communication device 20B) are stored in relation to a MAC address (MAC-An) of the wireless communication device 20A. Further, a radio wave status of the wireless communication device 20B measured by the wireless communication device 20A is stored in relation to the MAC address (MAC-An) of the wireless communication device 20A. Further, a MAC address, an SSID, a wireless channel, and a radio wave status of the second wireless connection unit 26 in the failed AP are stored in relation to a MAC address (MAC-Cn) of the wireless communication device 20C.

When a search operation is not performed on the target failed AP upon receiving the failure checking packet for the search mode (NO in Step S215), the wireless communication device 20A (20C) starts a search operation on the target failed AP. Then, the wireless communication device 20A (20C) measures a radio wave status of the failed AP (wireless communication device 20B) and transmits a failure checking packet for the search mode (Steps S216 to S219). The operation is similar to the operation in Steps S210 to S213 in FIG. 13. When the wireless communication device 20A (20C) performs a search operation on the target failed AP (YES in Step S215), Steps S216 to S219 are skipped.

Then, when all radio wave statuses from other APs excluding the failed AP (wireless communication device 20B) become available (YES in Step S220 in FIG. 12), the determination unit 13 in the wireless communication device 20A (20C) compares a locally measured radio wave status of the failed AP with the radio wave status from the other APs. When the locally measured radio wave status is best as a result of the comparison (YES in Step S221), the wireless communication device 20A (20C) determines to connect to the failed AP and shifts to the relief mode (Step S222). It is assumed here that the radio wave status measured by the wireless communication device 20A is better than the radio wave status measured by the wireless communication device 20C. Consequently, the wireless communication device 20A shifts to the relief mode.

When shifting to the relief mode, the wireless communication device 20A transmits a failure checking packet for the relief mode through the network connection unit 11 (Step S223). For example, the set values indicated in FIG. 8 are stored in the failure checking packet for the relief mode. Consequently, the wireless communication device 20A can notify other APs of information about the failed AP to be connected (relieved) by the local device.

Furthermore, the wireless communication device 20A starts an operation of the first wireless connection unit 14 (Step S224). At this time, the first wireless connection unit 14 uses a relief wireless profile (a MAC address, an SSID, an encryption mode, an encryption key, a wireless channel, and the like) not used by the APs in the network. Further, the first wireless connection unit 14 operates in the master unit mode and transmits a beacon.

When the locally measured radio wave status is not best as a result of the radio wave status comparison (NO in Step S221), the wireless communication device 20C returns to reception of a failure checking packet (Step S203 in FIG. 10). Then, when receiving a failure checking packet for the relief mode (RELIEF MODE in Step S204), the wireless communication device 20C learns that another AP relieves the wireless communication device 20B. Accordingly, when a search operation on the failed AP (wireless communication device 20B) is being performed (YES in Step S225), the wireless communication device 20C ends the search operation (Step S226).

When detecting occurrence of a failure of a network connection (YES in Step S201 in FIG. 9), the wireless communication device 20B in which the failure occurs starts an operation of the first wireless connection unit 14 (Step S227). At this time, the first wireless connection unit 14 in the wireless communication device 20B uses a predetermined relief wireless profile (an SSID, an encryption mode, and a password) and starts the operation in the slave device mode.

The wireless communication devices 20 (20A, 20B, 20C) previously share a wireless profile for relief with one another so that a failed AP may connect to each wireless communication device 20 in the relief mode. For example, a user may previously set the wireless profile for relief to each wireless communication device 20, or the wireless communication devices 20 may share the wireless profile with one another by a separate means.

When the first wireless connection unit 14 in the wireless communication device 20B starts the operation, the wireless communication device 20B discovers the wireless communication device 20A and belongs to wireless communication device 20A. Then, the second relay unit 27 in the wireless communication device 20B switches a relay destination of data transmitted and received by the second wireless connection unit 26 from the network connection unit 11 to the first wireless connection unit 14.

Figure 17:
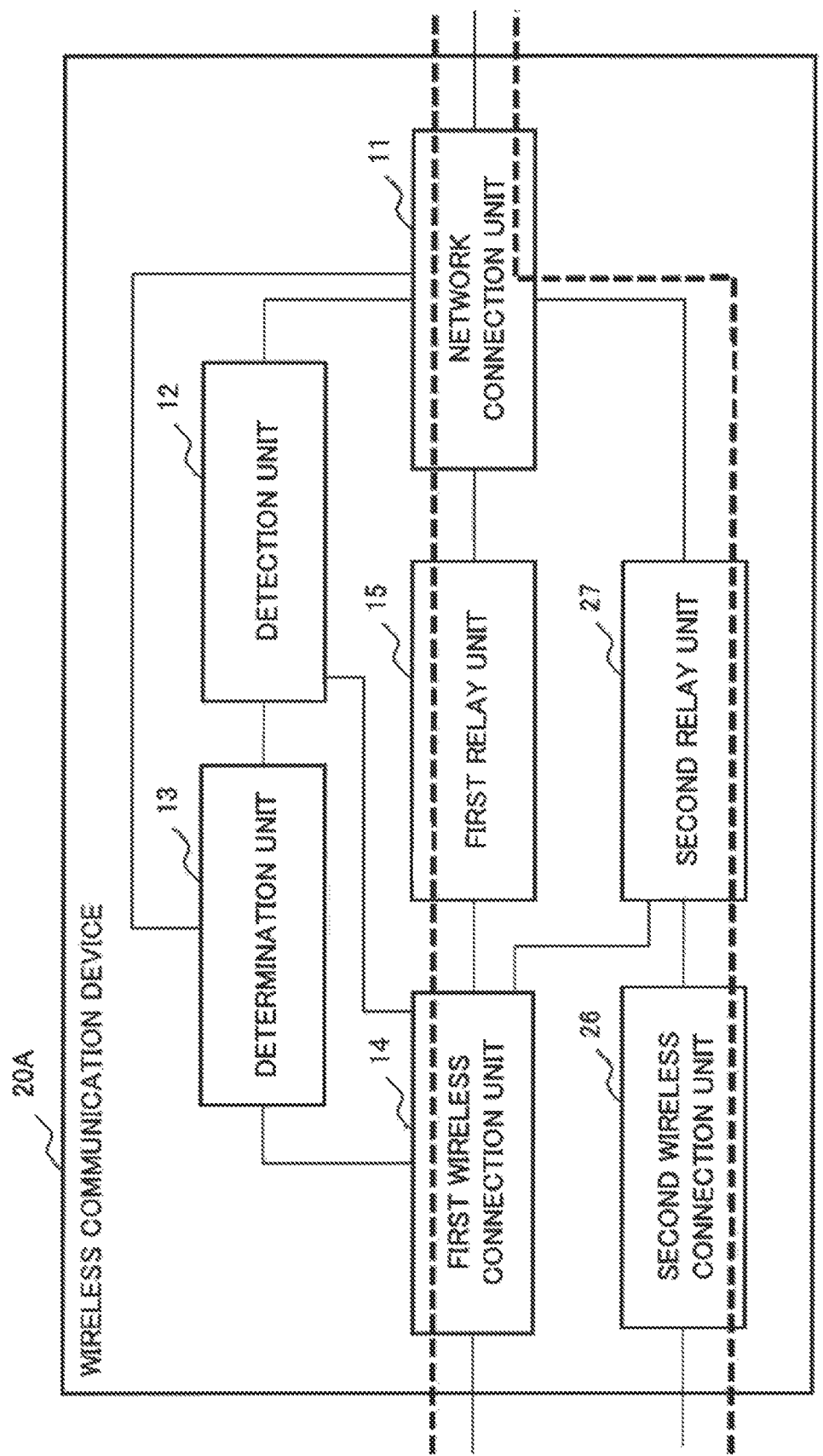
FIG. 17 shows a diagram illustrating an example of a data flow in the wireless communication device according to the second example embodiment of the present invention.

FIG. 17 illustrates a data transmission-reception path (dotted line) in the wireless communication device 20A in a state that the wireless communication device 20B (failed AP) is connected to the wireless communication device 20A. In the wireless communication device 20A, the second wireless connection unit 26 is connected to a wireless slave device belonging to the local device, and the second relay unit 27 relays data (a second communication) transmitted and received between the wireless slave device belonging to the local device and the network. Further, the first wireless connection unit 14 is connected to the wireless communication device 20B, and the first relay unit 15 relays data transmitted and received between the wireless communication device 20B and the network.

Figure 18:
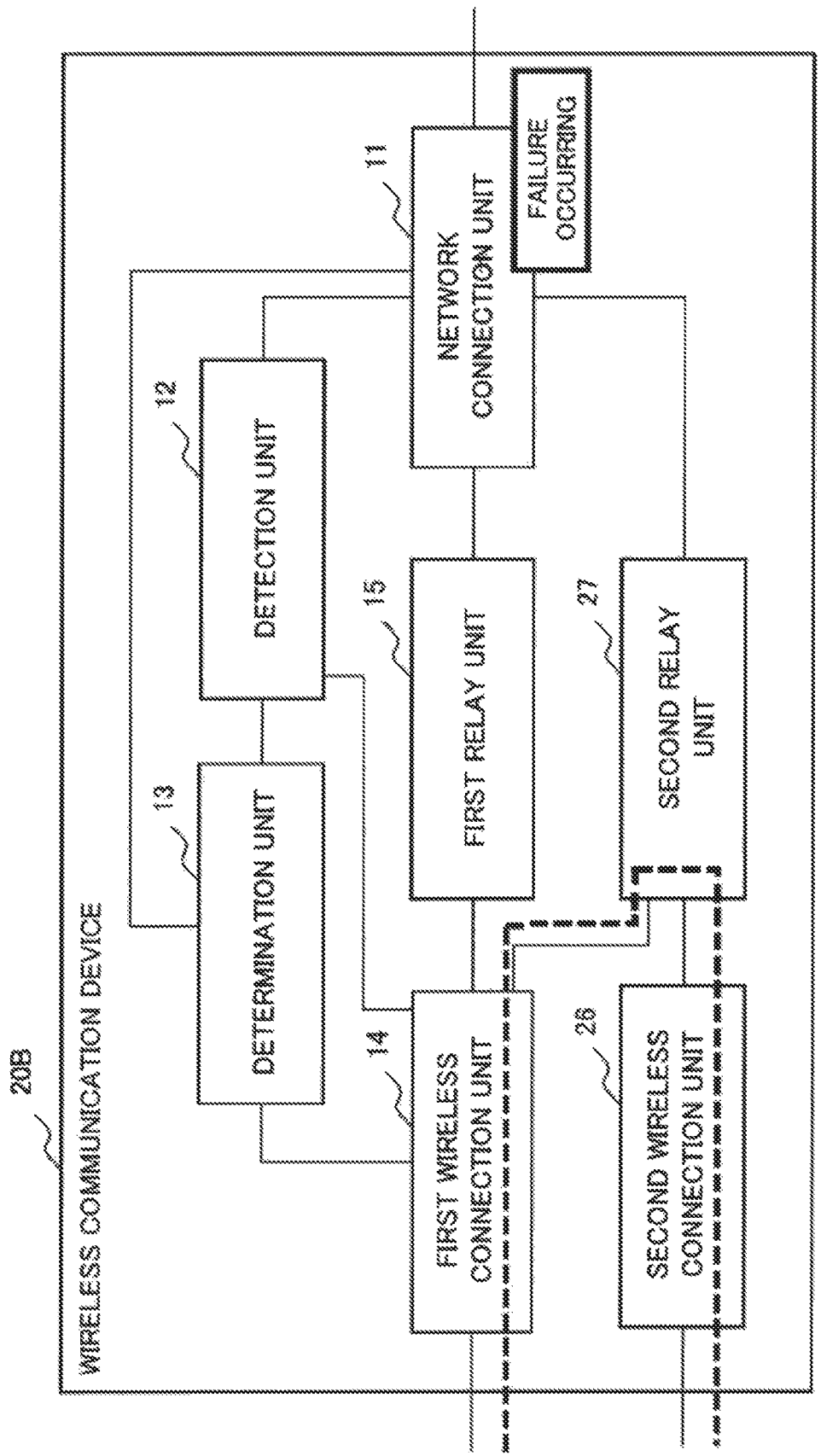
FIG. 18 shows a diagram illustrating an example of a data flow in the wireless communication device according to the second example embodiment of the present invention.

FIG. 18 illustrates a data transmission-reception path (dotted line) in the wireless communication device 20B at this time. The second relay unit 27 relays data (a third communication) transmitted and received between the wireless slave device 60 connected to the second wireless connection unit 26 and the wireless communication device 20A (a third wireless communication device) connected to the first wireless connection unit 14. Thus, the wireless slave device 60 belonging to the wireless communication device 20B may connect to the network through the wireless communication device 20B and the wireless communication device 20A.

The wireless communication device 20B may detect occurrence of a failure of a network connection by a method such as detecting disconnection of a LAN cable connected to the network connection unit 11 or detecting that a packet from the network side does not arrive for a predetermined period.

By operating as described above, when detecting occurrence of a failure of a network connection in another AP, the wireless communication device 20 determines whether or not to connect to the failed AP. Then, when determining to make a connection, the wireless communication device 20 makes a first wireless connection to the failed AP and relays a first communication between the failed AP and the network. When a failure occurs in another AP, the wireless communication device 20 makes a first wireless connection to the failed AP. Consequently, the wireless communication device 20 can make a first wireless connection to the failed AP, separately from a communication with a slave device belonging to the wireless communication device 20. Accordingly, a possibility of being unable to connect to an AP in which a failure of a network connection occurs can be reduced, and also a decline in a communication rate can be lessened.

As described above, when detecting occurrence of a failure of a network connection in another AP, the wireless communication device 20 according to the second example embodiment of the present invention determines whether or not to connect to the failed AP, similarly to the first example embodiment. Then, when determining to make a connection, the wireless communication device 20 makes a first wireless connection to the failed AP and relays a first communication between the failed AP and the network. When a failure occurs in another AP, the wireless communication device 20 makes a first wireless connection to the failed AP. Consequently, the wireless communication device 20 can make a first wireless connection to the failed AP, separately from a communication with a slave device belonging to the wireless communication device 20. Accordingly, a possibility of being unable to connect to an AP in which a failure of a network connection occurs can be reduced, and also a decline in a communication rate can be lessened.

Third Example Embodiment

Next, a third example embodiment of the present invention will be described. A case that a failure in a network connection unit 11 in a wireless communication device 20 disappears will be described, according to the present example embodiment.

First, a configuration example of the wireless communication device 20 according to the present example embodiment will be described by use of FIG. 4. The configuration example of the wireless communication device 20 according to the present example embodiment is almost similar to that according to the second example embodiment.

A detection unit 12 further detects failure recovery in the network connection unit 11 in the local device, according to the present example embodiment. Then, when the detection unit 12 detects failure recovery in the network connection unit 11, a first wireless connection unit 14 disconnects a connection to a wireless communication device 20 in the relief mode. Further, a second relay unit 27 restores a relay destination of data transmitted and received between a second wireless connection unit 26 and a wireless slave device 60 from the first wireless connection unit 14 to the network connection unit 11.

When a network connection recovers, the network connection unit 11 resumes transmission of a failure checking packet for the normal mode. Further, the detection unit 12 may transmit a failure checking packet for a recovery mode indicating recovery of the network connection through the network connection unit 11.

Furthermore, when the wireless communication device 20 is in the relief mode, the detection unit 12 further detects recovery of a failed AP connected in the relief mode. Detection of recovery may be detected by the network connection unit 11 receiving a failure checking packet for the recovery mode or the normal mode from a failed AP connected to the first wireless connection unit 14. Then, when the detection unit 12 detects recovery, the first wireless connection unit 14 disconnects a wireless connection (first wireless connection).

The remaining configuration is similar to that according to the second example embodiment, and therefore description is omitted.

By configuring the wireless communication device 20 as described above, when detecting occurrence of a failure of a network connection in another AP, the wireless communication device 20 determines whether or not to connect to the failed AP. Then, when determining to make a connection, the wireless communication device 20 makes a first wireless connection to the failed AP and relays a first communication between the failed AP and the network. Accordingly, a possibility of being unable to connect to an AP in which a failure of a network connection occurs can be reduced, and also a decline in a communication rate can be lessened.

Furthermore, when the local device is in the relief mode, the wireless communication device 20 according to the present example embodiment detects recovery of a network connection in the failed AP and disconnects a wireless connection to the failed AP. Further, when a network connection of the local device recovers, the wireless communication device 20 according to the present example embodiment disconnects a wireless connection to an AP in the relief mode and restores a relay destination of the second relay unit 27 from the first wireless connection unit 14 to the network connection unit 11. Consequently, when the network connection recovers, the failed AP and the AP in the relief mode can be restored to original states.

Figure 19:
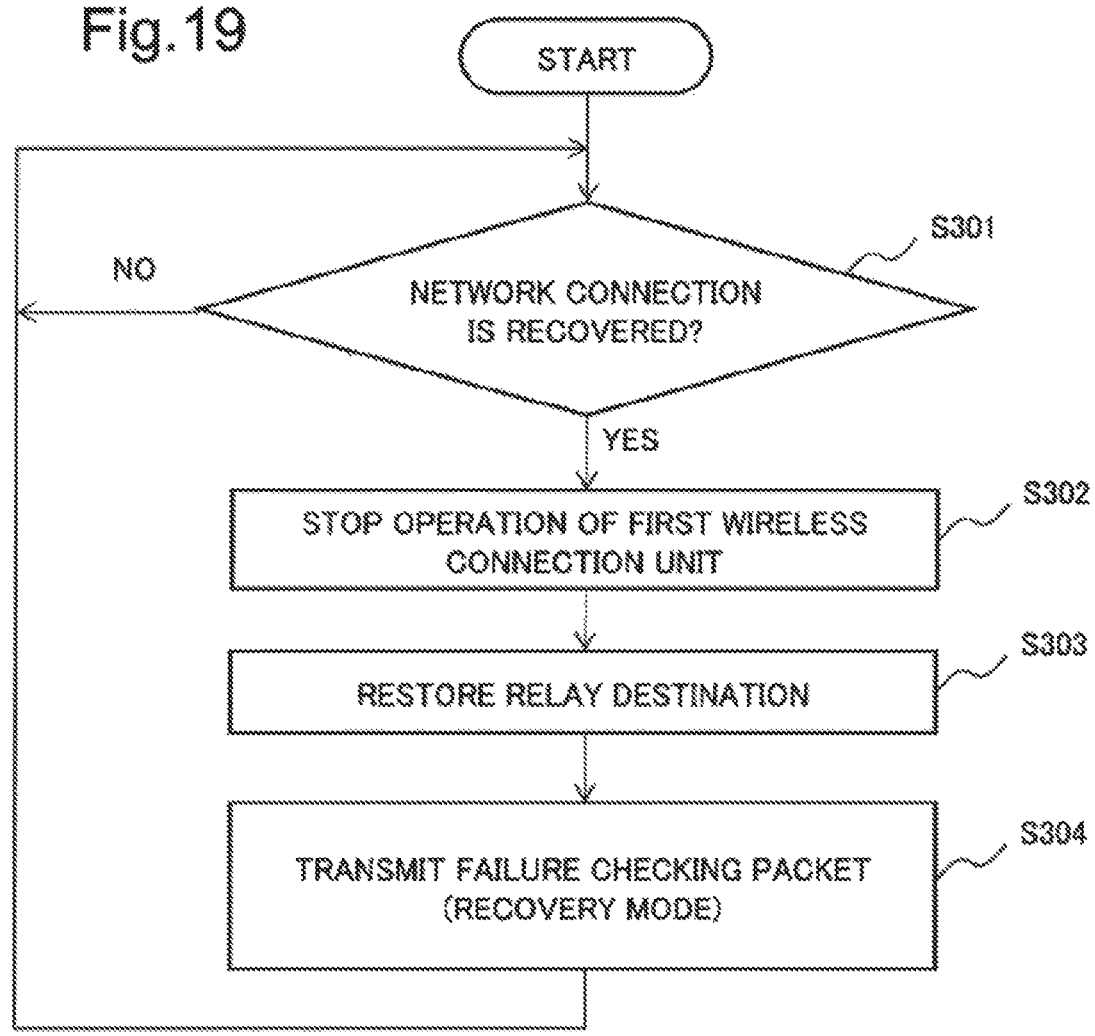
FIG. 19 shows a diagram illustrating an operation example of a wireless communication device according to a third example embodiment of the present invention.
Figure 20:
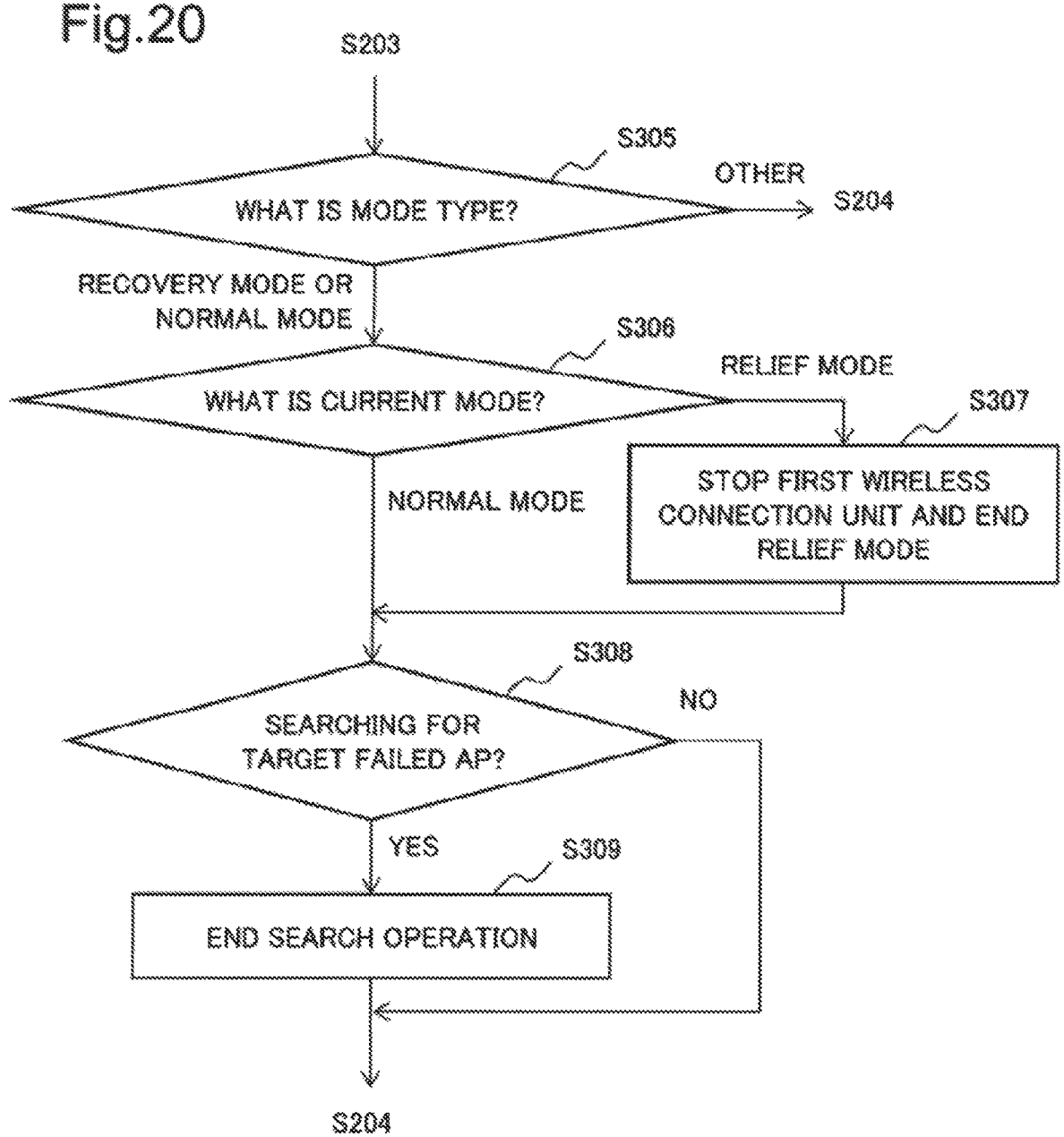
FIG. 20 shows a diagram illustrating an operation example of the wireless communication device according to the third example embodiment of the present invention.

Next, FIGS. 19 and 20 illustrate operation examples of the wireless communication device 20 according to the present example embodiment. FIG. 20 is an example of an operation performed between Steps S203 and S204 in FIG. 10. Further, it is assumed that a start of the operation in FIG. 19 is triggered by power-on of the wireless communication device 20 or a predetermined event after power-on such as a start-up operation by a user.

It is assumed that, similarly to the second example embodiment, a failure of a network connection occurs in the wireless communication device 20B, the wireless communication device 20A operates in the relief mode, and the wireless communication device 20B connects to the wireless communication device 20A. The operation example up to this point is similar to that according to the second example embodiment.

When the detection unit 12 in the wireless communication device 20B detects recovery of the failure of the network connection in the local device in this state (YES in Step S301 in FIG. 19), the first wireless connection unit 14 disconnects the wireless connection (Step S302). Further, the second relay unit 27 restores a relay destination of data transmitted and received to and from the wireless slave device 60 from the first wireless connection unit 14 to the network connection unit 11 (Step S303). Then, the detection unit 12 transmits a failure checking packet for the recovery mode through the network connection unit 11 (Step S304).

FIG. 21 illustrates a setting example of the failure checking packet for the recovery mode transmitted at this time. For example, a mode type indicating recovery of the local device and wireless set values of the second wireless connection unit 26 are stored in the data part, in this example. By receiving the failure checking packet for the recovery mode, another AP may detect recovery of the wireless communication device 20B from the failure of the network connection.

Furthermore, when recovering from the failure of the network connection, the network connection unit 11 transmits a failure checking packet for the normal mode at every predetermined time (Step S202 in FIG. 9). At this time, for example, the set values in FIG. 5 are stored in the failure checking packet. Another AP may also detect recovery of the wireless communication device 20B from the failure of the network connection by receiving the failure checking packet for the normal mode. Accordingly, Step S304 may be omitted.

The wireless communication device 20A receives a failure checking packet (Step S203 in FIG. 10) and checks a mode type of the failure checking packet. Then, when the mode type indicates the recovery mode or the normal mode (RECOVERY MODE or NORMAL MODE in Step S305 in FIG. 20), the wireless communication device 20A detects recovery of a network connection in a source AP of the failure checking packet from a failure.

Then, when the local device is in the relief mode, the wireless communication device 20A stops a wireless connection of the first wireless connection unit 14 and ends the relief mode (Step S307). Further, when the local device is performing a search operation for a target failed AP (YES in Step S308), the wireless communication device 20A ends the search operation (Step S309) and performs the operation in and after Step S204 in FIG. 10.

When the mode type of the failure checking packet is other than the recovery mode or the normal mode (OTHER in Step S305), the wireless communication device 20A performs the operation in and after Step S204 in FIG. 10.

By operating as described above, when detecting occurrence of a failure of a network connection in another AP, the wireless communication device 20 determines whether or not to connect to the failed AP. Then, when determining to make a connection, the wireless communication device 20 makes a first wireless connection to the failed AP and relays a first communication between the failed AP and the network. Accordingly, a possibility of being unable to connect to an AP in which a failure of a network connection occurs can be reduced, and also a decline in a communication rate can be lessened.

As described above, when detecting occurrence of a failure of a network connection in another AP, the wireless communication device 20 according to the third example embodiment of the present invention determines whether or not to connect to the failed AP, similarly to the first and second example embodiments. Then, when determining to make a connection, the wireless communication device 20 makes a first wireless connection to the failed AP and relays a first communication between the failed AP and the network. Accordingly, a possibility of being unable to connect to an AP in which a failure of a network connection occurs can be reduced, and a decline in a communication rate can be lessened.

Furthermore, when the local device is in the relief mode, the wireless communication device 20 according to the present example embodiment detects recovery of a network connection of a failed AP and disconnects a wireless connection to the failed AP. Further, when a network connection of the local device recovers, the wireless communication device 20 according to the present example embodiment disconnects a wireless connection to an AP in the relief mode and restores a relay destination of the second relay unit 27 from the first wireless connection unit 14 to the network connection unit 11. Consequently, when the network connection recovers, the failed AP and the AP in the relief mode can be restored to original states.

Fourth Example Embodiment

Next, a fourth example embodiment of the present invention will be described. The second and third example embodiments assume a case that a failure occurs in only one AP at a time. An example that failures occur in a plurality of APs will be described in the present example embodiment.

When further detecting occurrence of a failure in a new AP, an AP in the relief mode being connected to a failed AP also performs a search operation on the new failed AP, according to the present example embodiment. Then, when a radio wave status of the local device is also best for the new failed AP, a first wireless connection unit 14 is connected to the new failed AP, in addition to the AP in which a failure has occurred earlier.

Furthermore, a plurality of relief profiles to be used by the first wireless connection unit 14 are prepared, and an AP newly entering the relief mode uses a relief profile not used by another AP. Further, a failed AP connects to an AP in the relief mode by use of one of the plurality of prepared relief profiles. For example, the failed AP tries connection by making a connection with relief profiles one by one or connects to an AP with the best radio wave status.

First, a configuration example of a wireless communication device 20 according to the present example embodiment will be described by use of FIG. 4. The configuration example of the wireless communication device 20 according to the present example embodiment is almost similar to those according to the second and third example embodiments.

When a determination unit 13 determines to connect to a failed AP, the first wireless connection unit 14 uses a relief profile not used by another AP, out of a plurality of prepared relief profiles, according to the present example embodiment. A wireless profile used by the first wireless connection unit 14 is described in a failure checking packet for the relief mode, along with a wireless profile used by a second wireless connection unit 26. Accordingly, a relief profile used by another AP may be learned from the data part of a failure checking packet for the relief mode.

Furthermore, when the determination unit 13 determines to connect to a new failed AP, and the local device is already in the relief mode, the first wireless connection unit 14 does not change a relief wireless profile in use and wait to be connected by the new failed AP.

When the detection unit 12 detects a failure of a network connection in the local device, the first wireless connection unit 14 tries connection to an AP in the relief mode by using a plurality of prepared relief wireless profiles one by one. Then, when connection succeeds, communication is performed with the AP in the relief mode using the relief wireless profile. Alternatively, a radio wave status of an AP in the relief mode may be measured with each of the plurality of prepared relief wireless profiles, and a connection may be made to an AP with the best radio wave status.

The remaining configuration is similar to those according to the second and third example embodiments, and therefore description is omitted.

By configuring the wireless communication device 20 as described above, when detecting occurrence of a failure of a network connection in another AP, the wireless communication device 20 determines whether or not to connect to the failed AP. Then, when determining to make a connection, the wireless communication device 20 makes a first wireless connection to the failed AP and relays a first communication between the failed AP and the network. Accordingly, a possibility of being unable to connect to an AP in which a failure of a network connection occurs can be reduced, and also a decline in a communication rate can be lessened.

Furthermore, by preparing a plurality of wireless profiles for relief, the wireless communication device 20 according to the present example embodiment can also handle a case that a failure of a network connection occurs in a plurality of APs in the network.

Next, an operation example of the wireless communication device 20 according to the present example embodiment will be described. The operation example according to the present example embodiment is almost similar to those according to the second and third example embodiments.

Figure 12:
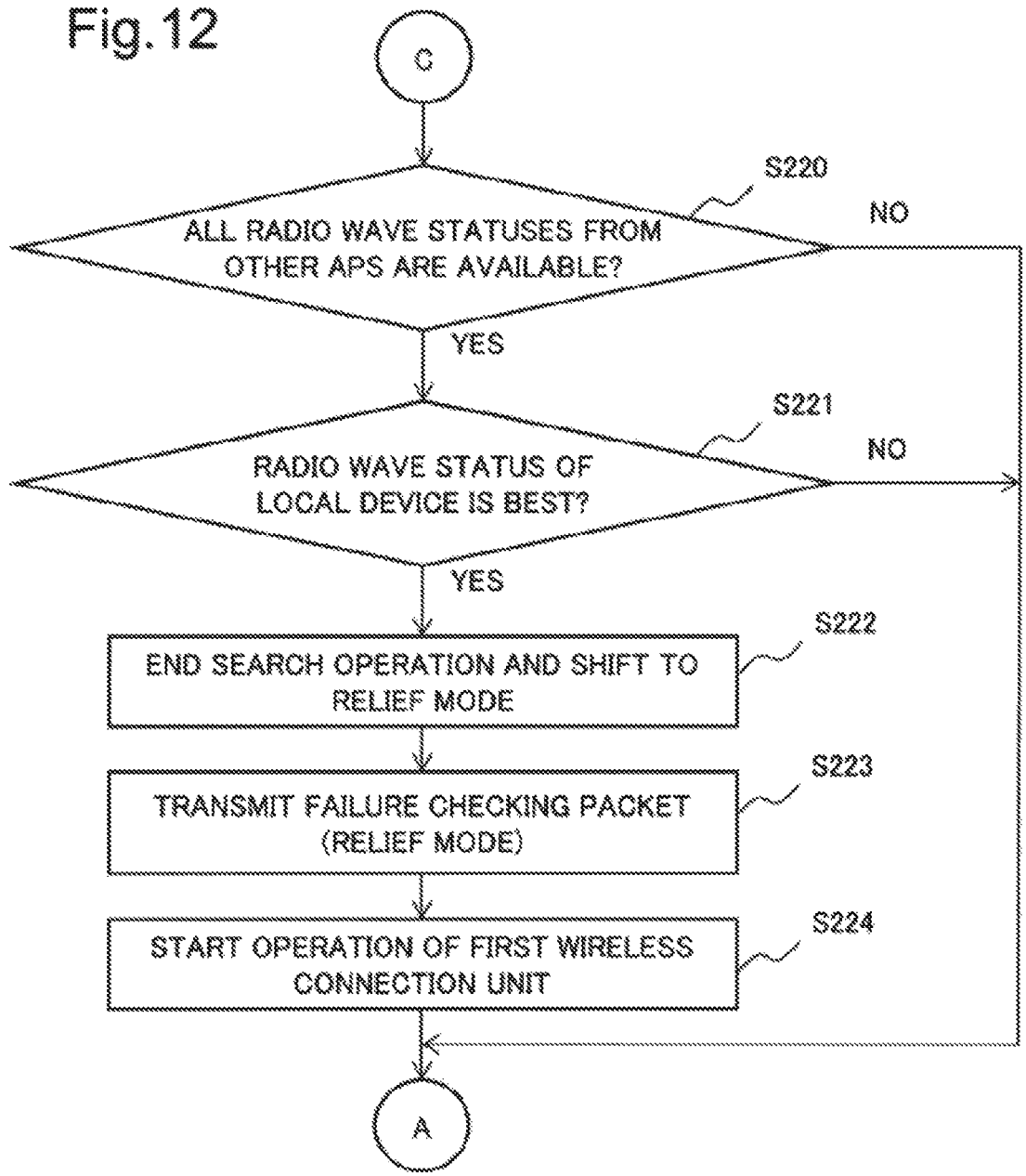
FIG. 12 shows a diagram illustrating an operation example of the wireless communication device according to the second example embodiment of the present invention.

When the local device is already connected in the relief mode to another failed AP in Step S224 in FIG. 12, the first wireless connection unit 14 continues an operation as-is with a relief profile and wait to be connected by a new failed AP, according to the present example embodiment. When another failed AP is not connected, an operation of the first wireless connection unit 14 is started by use of a relief profile not used by another AP.

Furthermore, the first wireless connection unit 14 in a failed AP detecting a failure of a network connection in the local device tries connection to an AP in the relief mode in Step S227 in FIG. 9, by using a plurality of prepared relief wireless profiles one by one. Then, when connection succeeds, communication is performed with the AP in the relief mode using the relief wireless profile. Alternatively, a radio wave status of an AP in the relief mode may be measured with each of the plurality of prepared relief wireless profiles, and a connection may be made to an AP with the best radio wave status.

By operating as described above, when detecting occurrence of a failure of a network connection in another AP, the wireless communication device 20 determines whether or not to connect to the failed AP. Then, when determining to make a connection, the wireless communication device 20 makes a first wireless connection to the failed AP and relays a first communication between the failed AP and the network. Accordingly, a possibility of being unable to connect to an AP in which a failure of a network connection occurs can be reduced, and also a decline in a communication rate can be lessened.

As described above, when detecting occurrence of a failure of a network connection in another AP, the wireless communication device 20 according to the fourth example embodiment of the present invention determines whether or not to connect to the failed AP, similarly to the first to third example embodiments. Then, when determining to make a connection, the wireless communication device 20 makes a first wireless connection to the failed AP and relays a first communication between the failed AP and the network. Accordingly, a possibility of being unable to connect to an AP in which a failure of a network connection occurs can be reduced, and also a decline in a communication rate can be lessened.

Furthermore, by preparing a plurality of wireless profiles for relief, the wireless communication device 20 according to the present example embodiment can handle a case that a failure of a network connection occurs in a plurality of APs in the network.

Hardware Configuration Example

A configuration example of hardware resources providing the wireless communication device (10, 20) according to each of the aforementioned example embodiments of the present invention by use of one information processing device (computer) will be described. The wireless communication device may be physically or functionally provided by use of at least two information processing devices. Further, the wireless communication device may be provided as a dedicated device. Further, only part of the functions of the wireless communication device may be provided by use of an information processing device.

Figure 22:
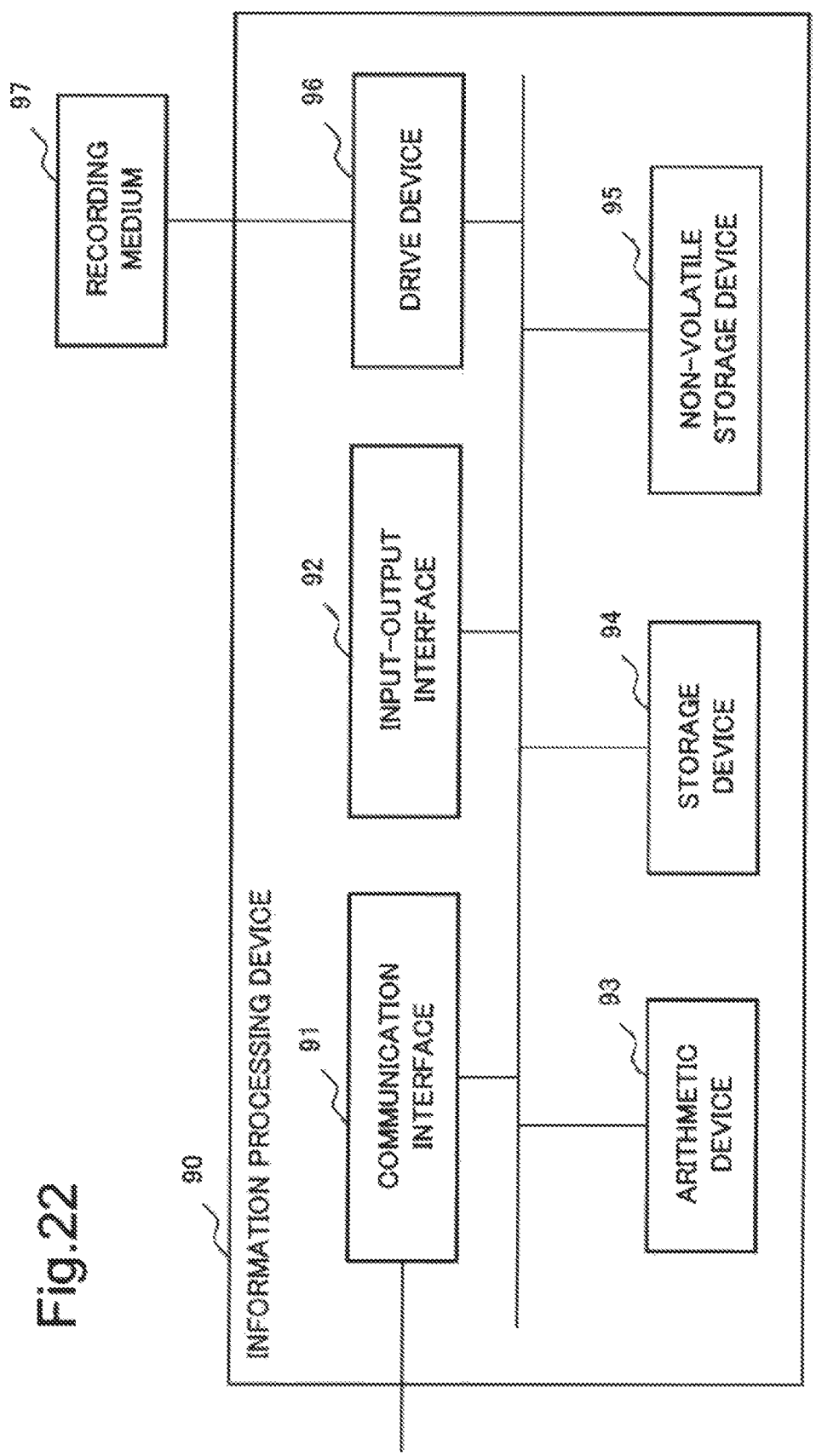
FIG. 22 shows a diagram illustrating a hardware configuration example according to each example embodiment of the present invention.

FIG. 22 is a diagram schematically illustrating a hardware configuration example of an information processing device capable of providing the wireless communication device according to each example embodiment of the present invention. The information processing device 90 includes a communication interface 91, an input-output interface 92, an arithmetic device 93, a storage device 94, a non-volatile storage device 95, and a drive device 96.

The communication interface 91 is a communication means for the wireless communication device according to each example embodiment to communicate with an external device in a wired and/or wireless manner. When the wireless communication device is provided by use of at least two information processing devices, the devices may be connected in a mutually communicable manner through the communication interface 91.

The input-output interface 92 is a man-machine interface such as a keyboard as an example of an input device or a display as an output device.

The arithmetic device 93 is an arithmetic processing device such as a general-purpose central processing unit (CPU) or a microprocessor. For example, the arithmetic device 93 is capable of reading various types of programs stored in the non-volatile storage device 95 into the storage device 94 and executing processing in accordance with the read programs.

The storage device 94 is a memory device referenceable from the arithmetic device 93, such as a random access memory (RAM), and stores a program, various types of data, and the like. The storage device 94 may be a volatile memory device.

For example, the non-volatile storage device 95 is a non-volatile storage device such as a read only memory (ROM) or a flash memory, and is capable of storing various types of programs, data, and the like.

For example, the drive device 96 is a device performing read and write processing of data from and to a recording medium 97 to be described later.

For example, the recording medium 97 is any recording medium capable of recording data, such as an optical disk, a magneto-optical disk, or a semiconductor flash memory.

For example, each example embodiment of the present invention may be provided by configuring a wireless communication device with the information processing device 90 illustrated in FIG. 22 and supplying a program capable of providing the functions described in each of the aforementioned example embodiments to the wireless communication device.

In this case, the example embodiment may be provided by the arithmetic device 93 executing the program supplied to the wireless communication device. Further, the functions of the wireless communication device may be configured in part instead of in whole with the information processing device 90.

Furthermore, the aforementioned program may be configured to be recorded in the recording medium 97 and be appropriately stored into the non-volatile storage device 95 in a shipping stage, an operation stage, or the like of the wireless communication device. In this case, a supply method of the program may employ a method of installation into the wireless communication device by use of a suitable jig in a manufacture stage before shipping, an operation stage, or the like. Further, the supply method of the program may employ a common procedure such as a method of external download through a communication line such as the Internet.

The whole or part of the example embodiments disclosed above can be described as, but not limited to, the following supplementary notes.

(Supplementary Note 1)

A wireless communication device comprising:

a network connection means for connecting to a network;

a detection means for detecting occurrence of a failure of a network connection in a first wireless communication device;

a determination means for, when detecting the occurrence of the failure, determining whether or not to make a first wireless connection to the first wireless communication device;

a first wireless connection means for, when making the determination to make the first wireless connection, making the first wireless connection to the first wireless communication device; and a first relay means for relaying a first communication between the first wireless communication device and the network.

(Supplementary Note 2)

The wireless communication device according to supplementary note 1, wherein the determination means makes the determination, based on a radio wave status of a wireless radio wave from the first wireless communication device.

(Supplementary Note 3)

The wireless communication device according to supplementary note 2, wherein the determination means measures the radio wave status of the first wireless communication device and transmits the radio wave status through the network, and also receives, through the network, the radio wave status of the first wireless communication device being measured by a second wireless communication device in which the occurrence of the failure does not exist, and, when the radio wave status measured by a local device is not worse than any of the radio wave status measured by the second wireless communication device, makes the determination to make the first wireless connection.

(Supplementary Note 4)

The wireless communication device according to any one of supplementary notes 1 to 3, wherein, when not receiving a packet from the first wireless communication device through the network for a predetermined period, the detection means detects the occurrence of the failure of the network connection in the first wireless communication device.

(Supplementary Note 5)

The wireless communication device according to any one of supplementary notes 1 to 4, wherein the detection means further detects disappearance of the failure of the network connection in the first wireless communication device, and, at a time of the disappearance of the failure, the first wireless connection means disconnects the first wireless connection to the first wireless communication device.

(Supplementary Note 6)

The wireless communication device according to supplementary note 5, wherein, when receiving a packet from the first wireless communication device through the network, the detection means detects the disappearance of the failure.

(Supplementary Note 7)

The wireless communication device according to any one of supplementary notes 1 to 6, wherein the network connection means transmits a packet at every predetermined time.

(Supplementary Note 8)

The wireless communication device according to any one of supplementary notes 1 to 7, wherein the detection means further detects the occurrence of the failure of the network connection in a local device, and, at a time of the occurrence of the failure of the network connection in the local device, the first wireless connection means starts a wireless connection operation with a predetermined wireless profile.

(Supplementary Note 9)

The wireless communication device according to supplementary note 8, wherein the detection means further detects disappearance of the failure of the network connection in the local device, and, at a time of the disappearance of the failure of the network connection in the local device, the first wireless connection means stops the wireless connection operation with the predetermined wireless profile.

(Supplementary Note 10)

The wireless communication device according to any one of supplementary notes 1 to 7, further comprising:

a second wireless connection means for making a second wireless connection to a wireless slave device; and a second relay means for relaying a second communication between the wireless slave device and the network.

(Supplementary Note 11)

The wireless communication device according to supplementary note 10, wherein the detection means further detects the occurrence of the failure of the network connection in a local device, and, at a time of the occurrence of the failure of the network connection in the local device, the first wireless connection means starts a wireless connection operation with a predetermined wireless profile.

(Supplementary Note 12)

The wireless communication device according to supplementary note 11, wherein, when being connected to a third wireless communication device by the wireless connection operation, the second relay means relays a third communication between the wireless slave device and the third wireless communication device.

(Supplementary Note 13)

The wireless communication device according to supplementary note 11 or 12, wherein the detection means further detects disappearance of the failure of the network connection in the local device, and, at a time of the disappearance of the failure of the network connection in the local device, the first wireless connection means stops the wireless connection operation with the predetermined wireless profile.

(Supplementary Note 14)

The wireless communication device according to supplementary note 13, wherein, when the wireless connection operation is stopped, the second relay means relays the second communication between the wireless slave device and the network.

(Supplementary Note 15)

A wireless communication method comprising:

detecting occurrence of a failure of a network connection in a first wireless communication device;

when detecting the occurrence of the failure, determining whether or not to make a first wireless connection to the first wireless communication device;

when making the determination to make the first wireless connection, making the first wireless connection to the first wireless communication device; and relaying a first communication between the first wireless communication device and a network.

(Supplementary Note 16)

The wireless communication method according to supplementary note 15, wherein the wireless communication method makes the determination, based on a radio wave status of a wireless radio wave from the first wireless communication device.

(Supplementary Note 17)

The wireless communication method according to supplementary note 16, further comprising:

measuring the radio wave status of the first wireless communication device and transmitting the radio wave status through the network, and also receiving, through the network, the radio wave status of the first wireless communication device being measured by a second wireless communication device in which the occurrence of the failure does not exist; and, when the radio wave status measured by a local device is not worse than any of the radio wave status measured by the second wireless communication device, making the determination to make the first wireless connection.

(Supplementary Note 18)

The wireless communication method according to any one of supplementary notes 15 to 17, further comprising, when not receiving a packet from the first wireless communication device through the network for a predetermined period, detecting the occurrence of the failure of the network connection in the first wireless communication device.

(Supplementary Note 19)

The wireless communication method according to any one of supplementary notes 15 to 18, further comprising:

detecting disappearance of the failure of the network connection in the first wireless communication device; and, at a time of the disappearance of the failure, disconnecting the first wireless connection to the first wireless communication device.

(Supplementary Note 20)

The wireless communication method according to supplementary note 19, further comprising, when receiving a packet from the first wireless communication device through the network, detecting the disappearance of the failure.

(Supplementary Note 21)

The wireless communication method according to any one of supplementary notes 15 to 20, further comprising transmitting a packet through the network at every predetermined time.

(Supplementary Note 22)

The wireless communication method according to any one of supplementary notes 15 to 21, further comprising:

detecting the occurrence of the failure of the network connection in a local device; and, at a time of the occurrence of the failure of the network connection in the local device, starting a wireless connection operation with a predetermined wireless profile.

(Supplementary Note 23)

The wireless communication method according to supplementary note 22, further comprising:

detecting disappearance of the failure of the network connection in the local device; and, at a time of the disappearance of the failure of the network connection in the local device, stopping the wireless connection operation with the predetermined wireless profile.

(Supplementary Note 24)

The wireless communication method according to any one of supplementary notes 15 to 21, further comprising:

making a second wireless connection to a wireless slave device; and relaying a second communication between the wireless slave device and the network.

(Supplementary Note 25)

The wireless communication method according to supplementary note 24, further comprising:

detecting the occurrence of the failure of the network connection in a local device; and, at a time of the occurrence of the failure of the network connection in the local device, starting a wireless connection operation with a predetermined wireless profile.

(Supplementary Note 26)

The wireless communication method according to supplementary note 25, further comprising, when being connected to a third wireless communication device by the wireless connection operation, relaying a third communication between the wireless slave device and the third wireless communication device.

(Supplementary Note 27)

The wireless communication method according to supplementary note 25 or 26, further comprising:

detecting disappearance of the failure of the network connection in the local device; and, at a time of the disappearance of the failure of the network connection in the local device, stopping the wireless connection operation with the predetermined wireless profile.

(Supplementary Note 28)

The wireless communication method according to supplementary note 27, further comprising, when stopping the wireless connection operation, relaying the second communication between the wireless slave device and the network.

(Supplementary Note 29)

A non-transitory computer readable recording medium recorded with a wireless communication program causing a computer to execute:

a network connection function of connecting to a network;

a detection function of detecting occurrence of a failure of a network connection in a first wireless communication device;

a determination function of, when detecting the occurrence of the failure, determining whether or not to make a first wireless connection to the first wireless communication device;

a first wireless connection function of, when making the determination to make the first wireless connection, making the first wireless connection to the first wireless communication device; and a first relay function of relaying a first communication between the first wireless communication device and the network.

(Supplementary Note 30)

The non-transitory computer readable recording medium recorded with the wireless communication program according to supplementary note 29, wherein the determination function makes the determination, based on a radio wave status of a wireless radio wave from the first wireless communication device.

(Supplementary Note 31)

The non-transitory computer readable recording medium recorded with the wireless communication program according to supplementary note 30, wherein the determination function measures the radio wave status of the first wireless communication device and transmits the radio wave status through the network, and also receives, through the network, the radio wave status of the first wireless communication device being measured by a second wireless communication device in which the occurrence of the failure does not exist, and, when the radio wave status measured by a local device is not worse than any of the radio wave status measured by the second wireless communication device, makes the determination to make the first wireless connection.

(Supplementary Note 32)

The non-transitory computer readable recording medium recorded with the wireless communication program according to any one of supplementary notes 29 to 31, wherein, when not receiving a packet from the first wireless communication device through the network for a predetermined period, the detection function detects the occurrence of the failure of the network connection in the first wireless communication device.

(Supplementary Note 33)

The non-transitory computer readable recording medium recorded with the wireless communication program according to any one of supplementary notes 29 to 32, wherein the detection function further detects disappearance of the failure of the network connection in the first wireless communication device, and, at a time of the disappearance of the failure, the first wireless connection function disconnects the first wireless connection to the first wireless communication device.

(Supplementary Note 34)

The non-transitory computer readable recording medium recorded with the wireless communication program according to supplementary note 33, wherein, when receiving a packet from the first wireless communication device through the network, the detection function detects the disappearance of the failure.

(Supplementary Note 35)

The non-transitory computer readable recording medium recorded with the wireless communication program according to any one of supplementary notes 29 to 34, wherein the network connection function transmits a packet at every predetermined time.

(Supplementary Note 36)

The non-transitory computer readable recording medium recorded with the wireless communication program according to any one of supplementary notes 29 to 35, wherein
the detection function further detects the occurrence of the failure of the network connection in a local device, and,
at a time of the occurrence of the failure of the network connection in the local device, the first wireless connection function starts a wireless connection operation with a predetermined wireless profile.
(Supplementary Note 37)
The non-transitory computer readable recording medium recorded with the wireless communication program according to supplementary note 36, wherein
the detection function further detects disappearance of the failure of the network connection in the local device, and,
at a time of the disappearance of the failure of the network connection in the local device, the first wireless connection function stops the wireless connection operation with the predetermined wireless profile.
(Supplementary Note 38)
The non-transitory computer readable recording medium recorded with the wireless communication program according to any one of supplementary notes 29 to 35 causing a computer to further execute:
a second wireless connection function of making a second wireless connection to a wireless slave device; and
a second relay function of relaying a second communication between the wireless slave device and the network.
(Supplementary Note 39)
The non-transitory computer readable recording medium recorded with the wireless communication program according to supplementary note 38, wherein
the detection function further detects the occurrence of the failure of the network connection in a local device, and,
at a time of the occurrence of the failure of the network connection in the local device, the first wireless connection function starts a wireless connection operation with a predetermined wireless profile.
(Supplementary Note 40)
The non-transitory computer readable recording medium recorded with the wireless communication program according to supplementary note 39, wherein,
when being connected to a third wireless communication device by the wireless connection operation, the second relay function relays a third communication between the wireless slave device and the third wireless communication device.
(Supplementary Note 41)
The non-transitory computer readable recording medium recorded with the wireless communication program according to supplementary note 39 or 40, wherein
the detection function further detects disappearance of the failure of the network connection in the local device, and,
at a time of the disappearance of the failure of the network connection in the local device, the first wireless connection function stops the wireless connection operation with the predetermined wireless profile.
(Supplementary Note 42)
The non-transitory computer readable recording medium recorded with the wireless communication program according to supplementary note 41, wherein,
when the wireless connection operation is stopped, the second relay function relays the second communication between the wireless slave device and the network.
While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese Patent Application No. 2016-226989, filed on Nov. 22, 2016, the disclosure of which is incorporated herein in its entirety by reference.

REFERENCE SIGNS LIST 10, 20 Wireless communication device
11 Network connection unit
12 Detection unit
13 Determination unit
14 First wireless connection unit
15 First relay unit
26 Second wireless connection unit
27 Second relay unit
50 Layer 3 switch
60 Wireless slave device
90 Information processing device
91 Communication interface
92 Input-output interface
93 Arithmetic device
94 Storage device
95 Non-volatile storage device
96 Drive device
97 Recording medium

What is claimed is:

1. A wireless communication device comprising:
a network connector configured to connect to a network;
a detector configured to detect that no packets have been received from a first wireless communication device through a network during a predetermined time, and in response to detecting that no packets have been received from the first wireless communication device through the network during the predetermined period, conclude that a failure of a network connection in the first wireless communication device has occurred, such that the failure is accordingly detected, the first wireless communication device being a different wireless communication device than the wireless communication device;
a determinator configured to, in response to detection of the failure of the network connection, determine whether or not to make a first wireless connection to the first wireless communication device based on a radio wave status of a wireless radio wave from the first wireless communication device;
a first wireless connector configured to, in response to a determination that the first wireless connection should be made, make the first wireless connection to the first wireless communication device; and
a first relay configured to, subsequent to making the first wireless connection to the first wireless communication device, relay a first communication between the first wireless communication device and the network over the first wireless connection.

2. The wireless communication device according to claim 1, wherein
the determinator measures the radio wave status of the first wireless communication device and transmits the radio wave status through the network, and also receives, through the network, the radio wave status of the first wireless communication device being measured by a second wireless communication device in which the occurrence of the failure does not exist, and, when the radio wave status measured by a local device is not worse than any of the radio wave status measured by the second wireless communication device, makes the determination to make the first wireless connection.

3. The wireless communication device according to claim 1, wherein
the detector further detects that the failure of the network connection in the first wireless communication device is no longer present, and
in response to detecting that the failure is no longer present, the first wireless connector disconnects the first wireless connection to the first wireless communication device.

4. The wireless communication device according to claim 3, wherein,
in response to a packet from the first wireless communication device through the network, the detector detects that the failure is no longer present.

5. The wireless communication device according to claim 1, wherein the network connector transmits a packet at every predetermined time.

6. The wireless communication device according to claim 1, wherein
the detector further detects the failure of the network connection in a local device, and,
in response to detecting the failure of the network connection in the local device, the first wireless connector starts a wireless connection operation with a predetermined wireless profile.

7. The wireless communication device according to claim 6, wherein
the detector further detects that the failure of the network connection in the local device is no longer present, and,
in response to detecting that the failure is no longer present, the first wireless connector stops the wireless connection operation with the predetermined wireless profile.

8. The wireless communication device according to claim 1, further comprising:
a second wireless connector configured to make a second wireless connection to a wireless slave device; and
a second relay configured to relay a second communication between the wireless slave device and the network over the second wireless connection.

9. The wireless communication device according to claim 8, wherein
the detector further detects the failure of the network connection in a local device, and,
in response to detecting the failure of the network connection in the local device, the first wireless connector starts a wireless connection operation with a predetermined wireless profile.

10. The wireless communication device according to claim 9, wherein,
subsequent to connection to a third wireless communication device by the wireless connection operation, the second relay relays a third communication between the wireless slave device and the third wireless communication device in accordance with the wireless connection operation.

11. The wireless communication device according to claim 9, wherein
the detector further detects the failure of the network connection in the local device is no longer present, and,
in response to detecting that the failure is no longer present, the first wireless connector stops the wireless connection operation with the predetermined wireless profile.

12. The wireless communication device according to claim 11, wherein,
subsequent to the wireless connection operation being stopped, the second relay relays the second communication between the wireless slave device and the network.

13. The wireless communication device according to claim 1, wherein the network connector connects to the network through a wired connection.

14. A wireless communication method for a wireless communication device, the method comprising:
detecting that no packets have been received from a first wireless communication device through a network during a predetermined time, and in response to detecting that no packets have been received from the first wireless communication device through the network during the predetermined time, concluding that a failure of a network connection in the first wireless communication device has occurred, such that the failure is accordingly detected, the first wireless communication device being a different device than the wireless communication device;
in response to detection of the failure of the network connection, determining whether or not to make a first wireless connection to the first wireless communication device based on a radio wave status of a wireless radio from the first wireless communication device;
in response to a determination that the first wireless connection should be made, making the first wireless connection to the first wireless communication device; and
subsequent to making the first wireless connection to the first wireless communication device, relaying a first communication between the first wireless communication device and a network over the first wireless connection.

15. The wireless communication method according to claim 14, further comprising:
measuring the radio wave status of the first wireless communication device and transmitting the radio wave status through the network, and also receiving, through the network, the radio wave status of the first wireless communication device being measured by a second wireless communication device in which the occurrence of the failure does not exist; and,
when the radio wave status measured by a local device is not worse than any of the radio wave status measured by the second wireless communication device, making the determination to make the first wireless connection.

16. The wireless communication method according to claim 14, further comprising:
detecting that the failure of the network connection in the first wireless communication device is no longer present; and,
in response to detecting that the failure is no longer present, disconnecting the first wireless connection to the first wireless communication device.

17. The wireless communication method according to claim 14 further comprising:
connecting to a network through a wired connection.

18. A non-transitory computer readable recording medium recorded with a wireless communication program for a wireless communication device, the program causing a computer to execute:
- a network connection function of connecting to a network;
- a detection function of detecting that no packets have been received from a first wireless communication device through a network during a predetermined time, and in response to detecting that no packets have been received from the first wireless communication device through the network during the predetermined time, concluding that a failure of a network connection in the first wireless communication device has occurred, such that the failure is accordingly detected, the first wireless communication device being a different device than the wireless communication device;
- a determination function of, in response to detection of the failure of the network connection, determining whether or not to make a first wireless connection to the first wireless communication device based on a radio wave status of a wireless radio from the first wireless communication device;
- a first wireless connection function of, in response to a determination that the first wireless connection should be made, making the first wireless connection to the first wireless communication device; and
- a first relay function of subsequent to making the first wireless connection to the first wireless communication device, relaying a first communication between the first wireless communication device and a network over the first wireless connection.

19. The non-transitory computer readable recording medium recorded with the wireless communication program according to claim 18 wherein
the network connection function connects to the network through a wired connection.

* * * * *